US006888522B1

(12) United States Patent
Shibata et al.

(10) Patent No.: US 6,888,522 B1
(45) Date of Patent: May 3, 2005

(54) INFORMATION DISPLAY APPARATUS

(75) Inventors: Yoshifumi Shibata, Toyokawa (JP); Kiyofumi Hashimoto, Suita (JP); Eiji Yamakawa, Sanda (JP); Hideo Hotomi, Nishinomiya (JP); Naoki Masazumi, Kobe (JP); Koichi Kohriyama, Amagasaki (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/537,773

(22) Filed: Mar. 29, 2000

(30) Foreign Application Priority Data

Mar. 31, 1999 (JP) .......................................... 11-093007
Jun. 9, 1999 (JP) .......................................... 11-161939
Sep. 30, 1999 (JP) .......................................... 11-279074

(51) Int. Cl.[7] .............................................. G09G 3/36
(52) U.S. Cl. ......................................... 345/87; 345/99
(58) Field of Search .......................... 345/1, 3, 84, 85, 345/87, 88, 90, 92, 93, 94, 98, 99, 100, 118, 115, 103; 348/14.07, 571; 340/706, 708; 359/84, 85; 349/184

(56) References Cited

U.S. PATENT DOCUMENTS

| 5,049,862 | A | * | 9/1991 | Dao et al. ................... 345/179 |
|-----------|---|---|--------|---------------------------------------|
| 5,319,382 | A | * | 6/1994 | Fitzpatrick et al. ......... 345/621 |
| 5,657,141 | A | * | 8/1997 | Terada et al. ........... 252/299.01 |
| 5,726,679 | A | * | 3/1998 | Kanno et al. ............... 345/100 |
| 5,754,160 | A | * | 5/1998 | Shimizu et al. ............ 345/103 |
| 5,818,410 | A | * | 10/1998 | Inoue et al. ................ 345/684 |
| 5,926,154 | A | * | 7/1999 | Hirono et al. ................ 345/15 |
| 5,933,128 | A | * | 8/1999 | Kuribayashi et al. ......... 345/95 |
| 5,990,859 | A | * | 11/1999 | Inoue et al. ................ 345/103 |
| 6,043,798 | A | * | 3/2000 | Yamamoto et al. .......... 345/1.1 |
| 6,133,895 | A | | 10/2000 | Huang .......................... 345/94 |
| 6,154,190 | A | * | 11/2000 | Yang et al. ................... 345/94 |
| 6,219,022 | B1 | * | 4/2001 | Yamazaki et al. .......... 345/103 |
| 6,262,705 | B1 | * | 7/2001 | Inoue et al. ................. 345/100 |
| 6,268,840 | B1 | * | 7/2001 | Huang .......................... 345/94 |
| 6,278,429 | B1 | * | 8/2001 | Ruth et al. ..................... 345/94 |
| 6,285,391 | B1 | * | 9/2001 | Shibata et al. ........... 348/14.07 |
| 6,414,669 | B1 | * | 7/2002 | Masazumi .................... 345/98 |
| 6,466,369 | B1 | * | 10/2002 | Maddock ..................... 359/460 |
| 2002/0075202 | A1 | * | 6/2002 | Fergason ...................... 345/32 |

FOREIGN PATENT DOCUMENTS

| JP | 58-005720 A | 1/1983 |
|----|-------------|--------|
| JP | 6-004042 A | 1/1994 |
| JP | 9-329780 A | 12/1997 |
| JP | 10-011030 A | 1/1998 |
| JP | 10-197850 A | 7/1998 |

OTHER PUBLICATIONS

U.S. Appl. No. 09/510,847, filed Feb. 23, 2000, Yamakawa et al.

Japanese Notice of Rejection issued on Japanese Patent Application No. H11–008674.

* cited by examiner

*Primary Examiner*—Vijay Shankar
*Assistant Examiner*—Nitin Patel
(74) *Attorney, Agent, or Firm*—Sidley Austin Brown & Wood LLP

(57) ABSTRACT

An information display apparatus which has a liquid crystal display which uses chiral nematic liquid crystal with a memory effect and can be driven by a matrix driving method. The screen of the display is divided along a scanning line into a still picture display area and a motion picture display area. The information display apparatus may have a first display and a second display on one screen. The first display is a reflective type liquid crystal display with a memory effect, which has an advantage of saving energy, and is used exclusively to display a still picture. The second display is a liquid crystal display which requires only a short time for writing. Information to be written in a short time, such as inputted information, is displayed on the second display.

15 Claims, 33 Drawing Sheets

F I G. 5
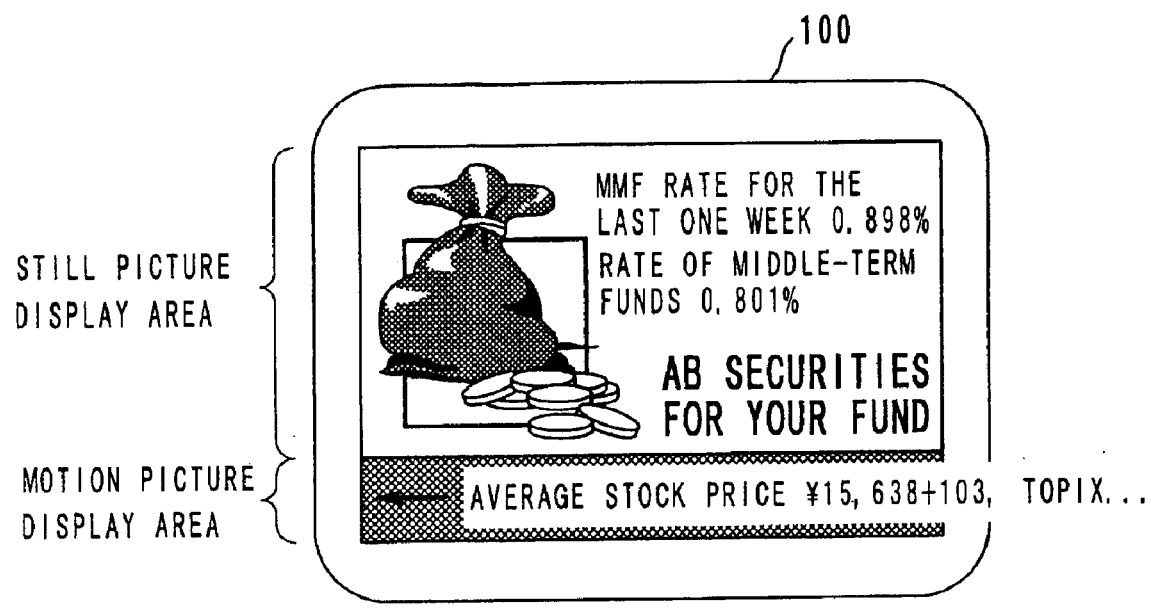
F I G. 6
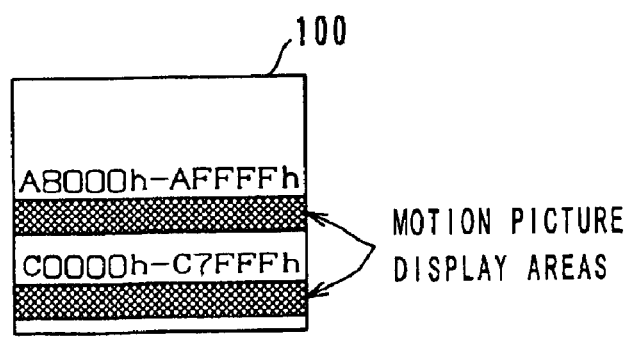

F I G. 13
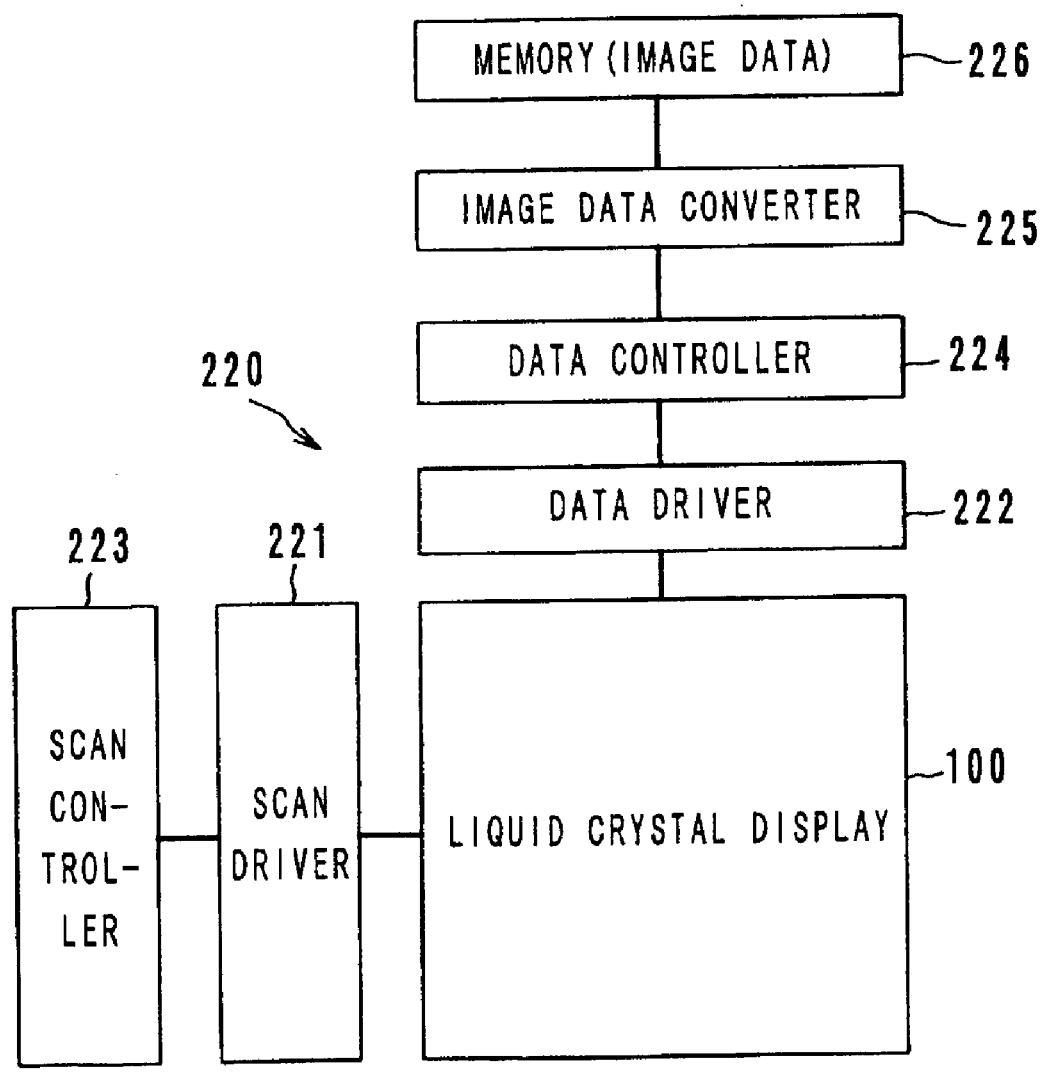

INPUT

ENTER

DESIGNATION OF PART TO BE CHANGED

REVISION

COMPLETION OF REVISION

F I G. 19
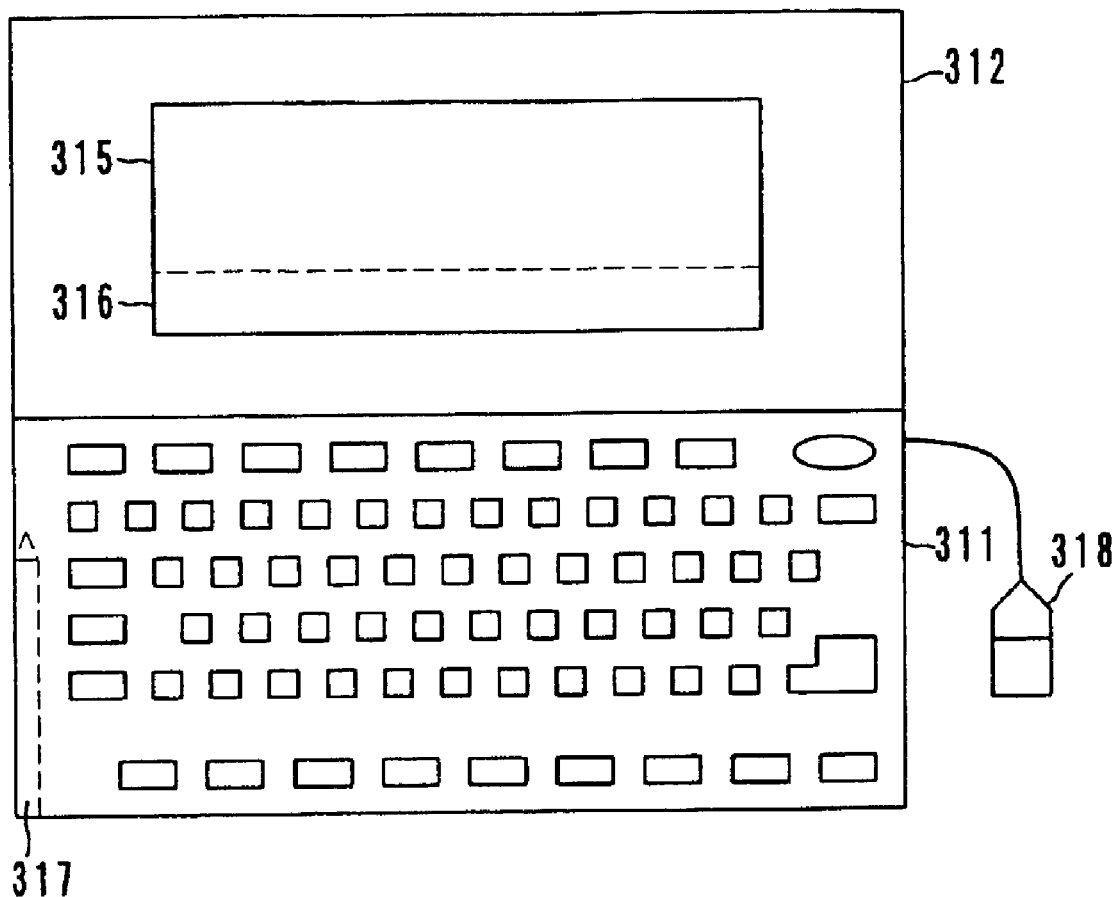
F I G. 20
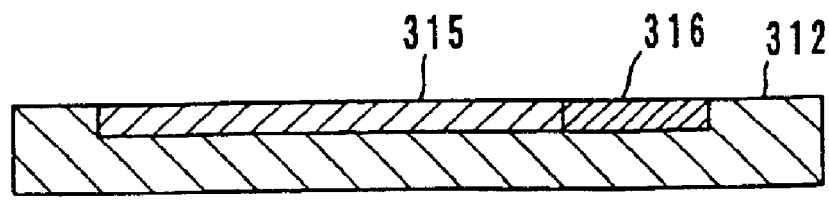

FIG. 22a

DESIGNATION OF
PART TO BE CHANGED      317

MEETING ON — 315
MARCH 9 AT 1:00PM IN ROOM 1
AT 1:00PM IN ROOM 1 — 316

FIG. 22b

DESIGNATION OF
LETTERS TO BE CHANGED    317

MEETING ON — 315
MARCH 9 AT 1:00PM IN ROOM 1
AT 1:00PM IN ROOM — 316

FIG. 22c

REVISION    317

MEETING ON — 315
MARCH 9 AT 1:00PM IN ROOM 1
AT 1:00PM IN ROOM 2 — 316

FIG. 22d

COMPLETION OF REVISION

MEETING ON — 315
MARCH 9 AT 1:00PM IN ROOM 2
— 316

F I G. 23
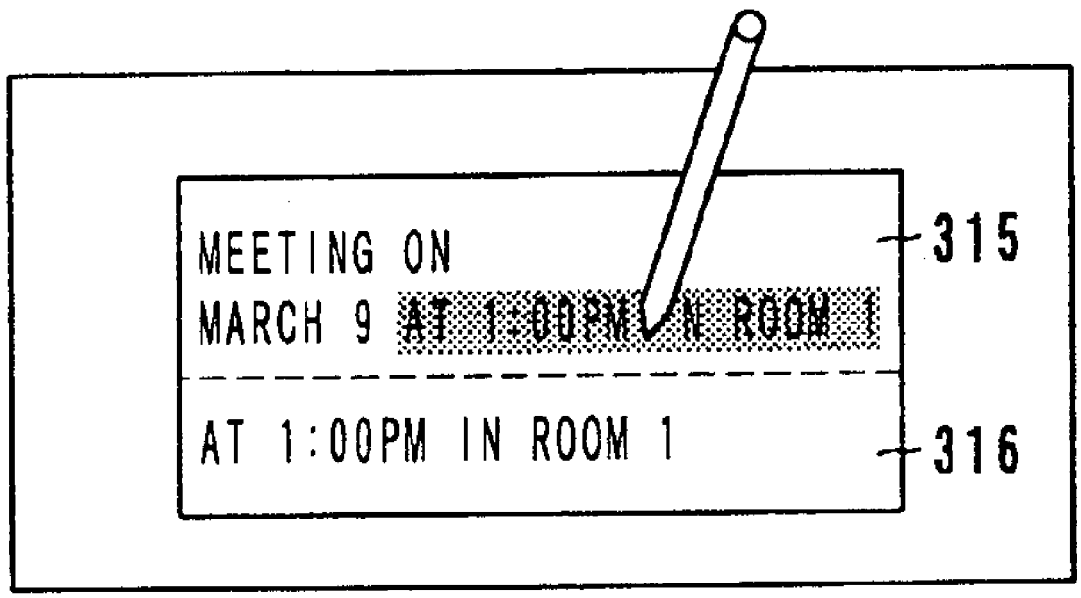

F I G. 2 4
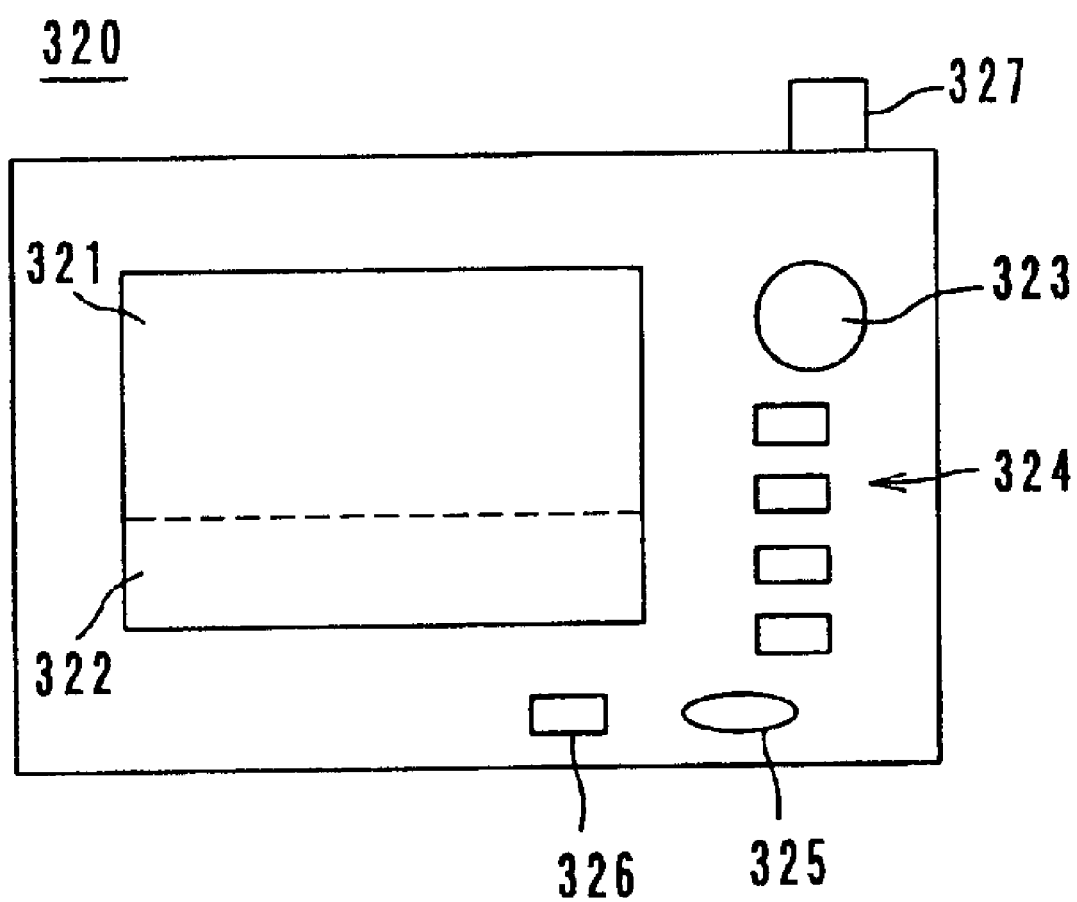

F I G. 25a
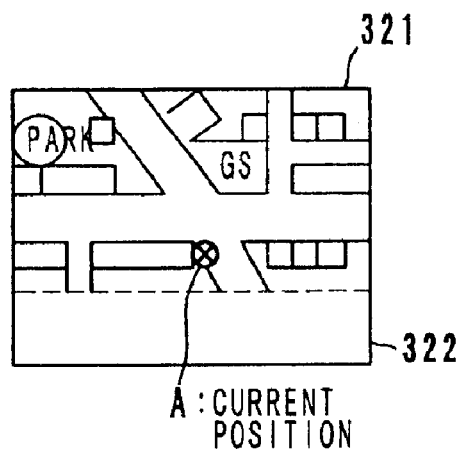
F I G. 25b
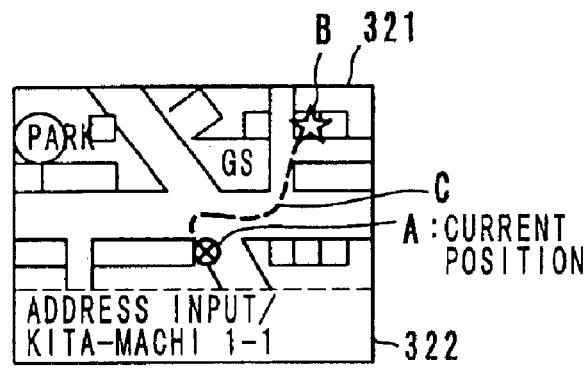
F I G. 26a
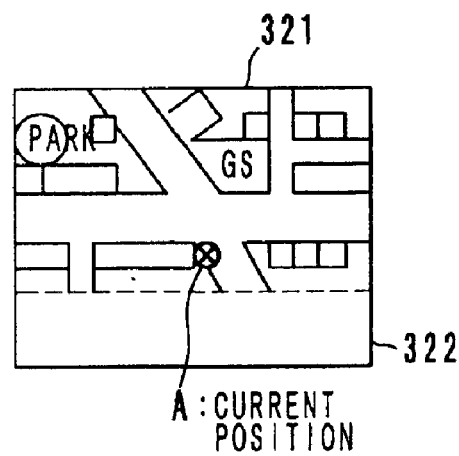
F I G. 26b
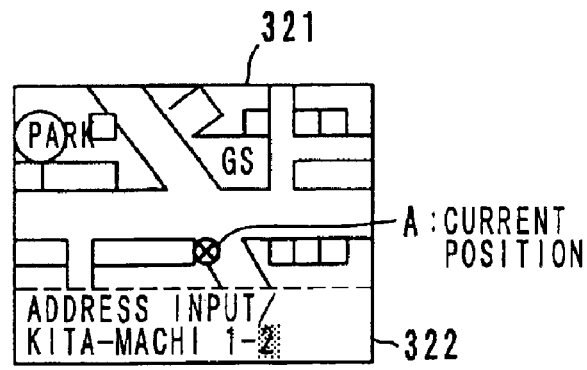

F I G. 27
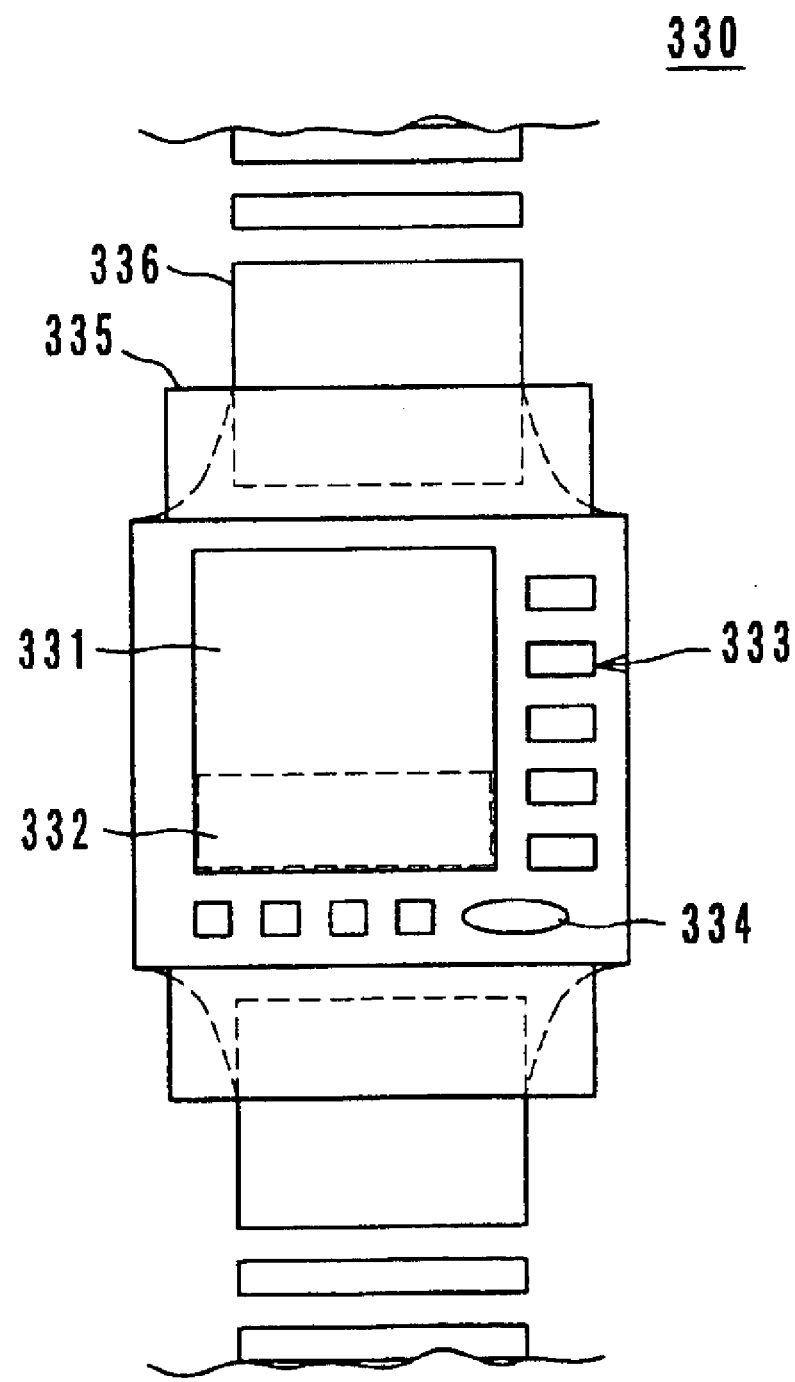

F I G. 2 9
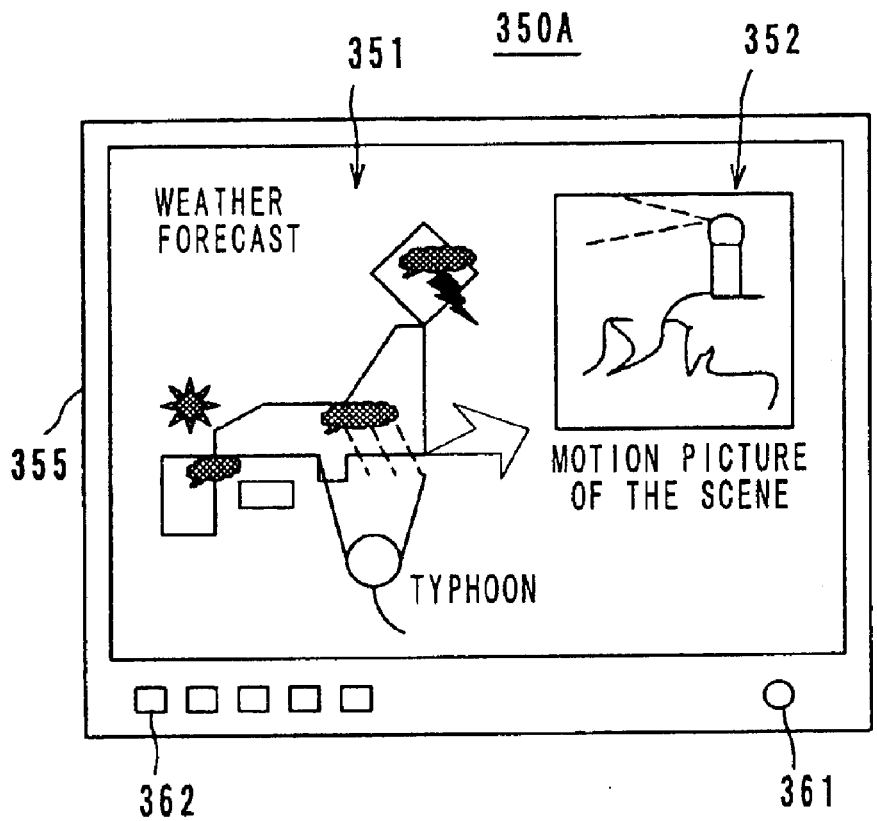
F I G. 3 0
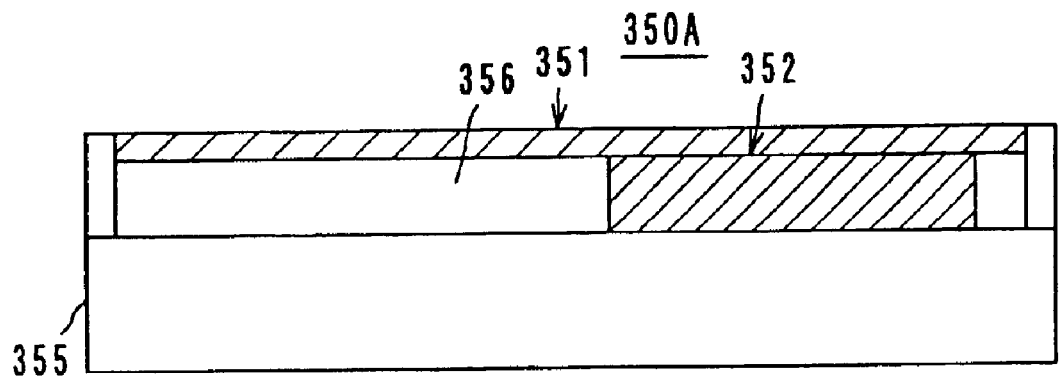

F I G. 3 1
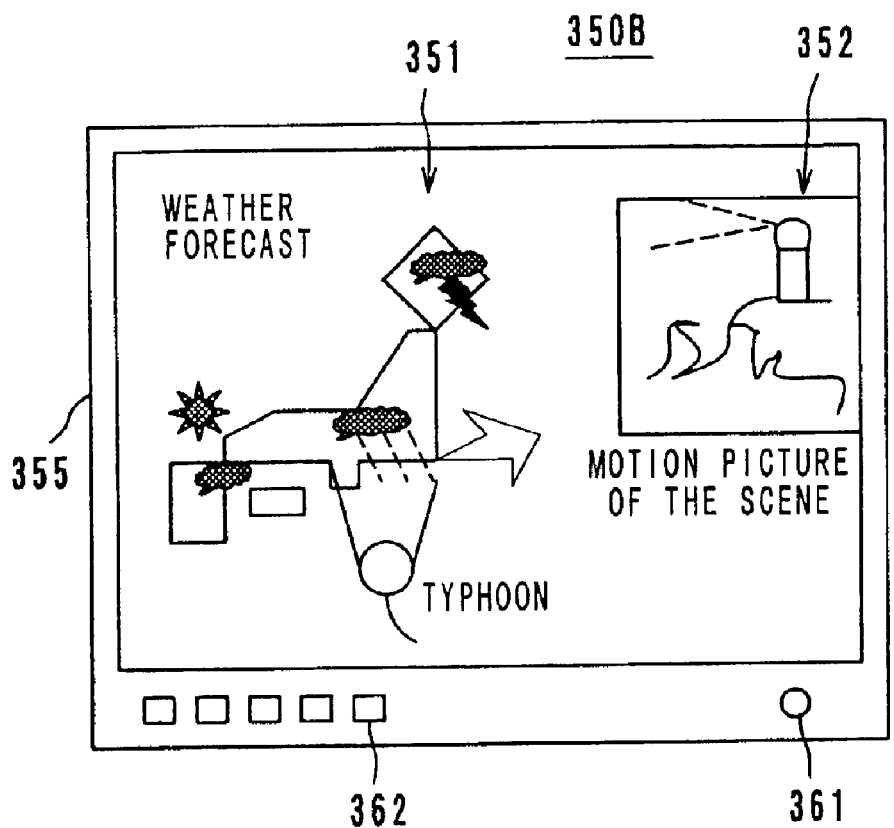
F I G. 3 2
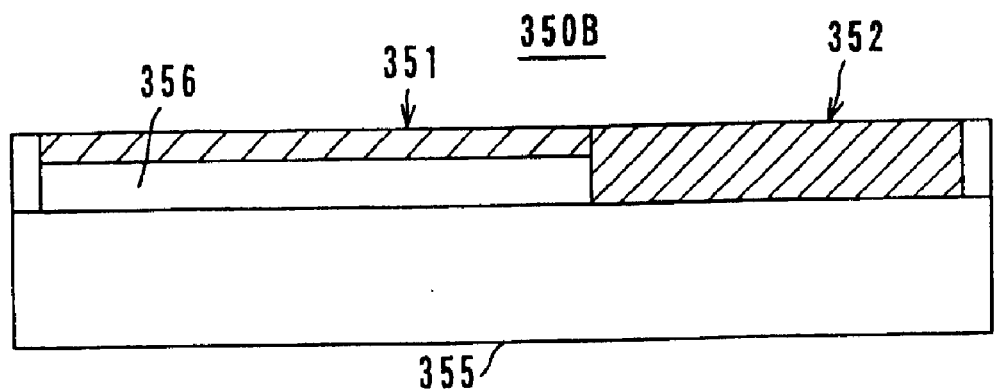

F I G. 3 9
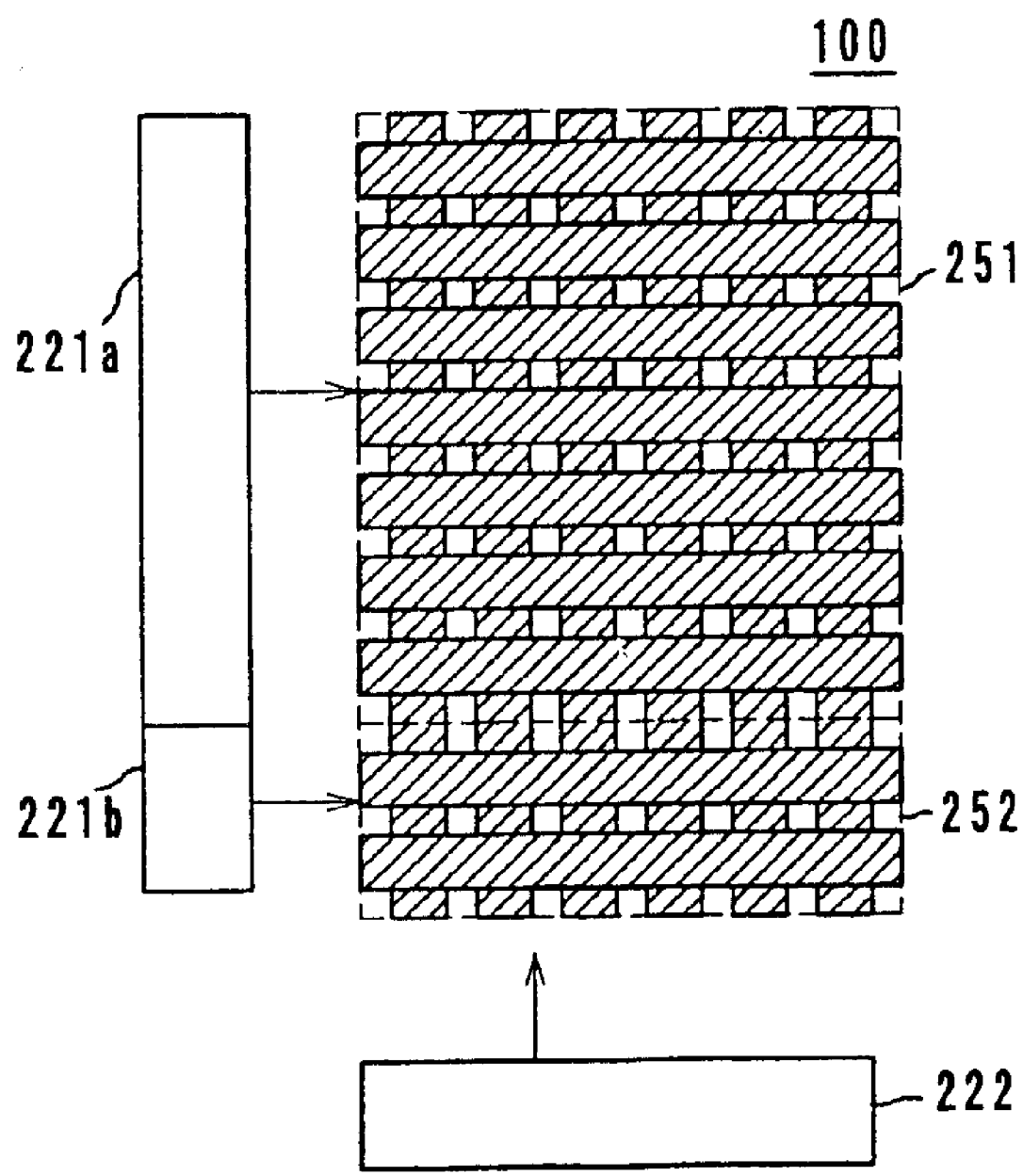

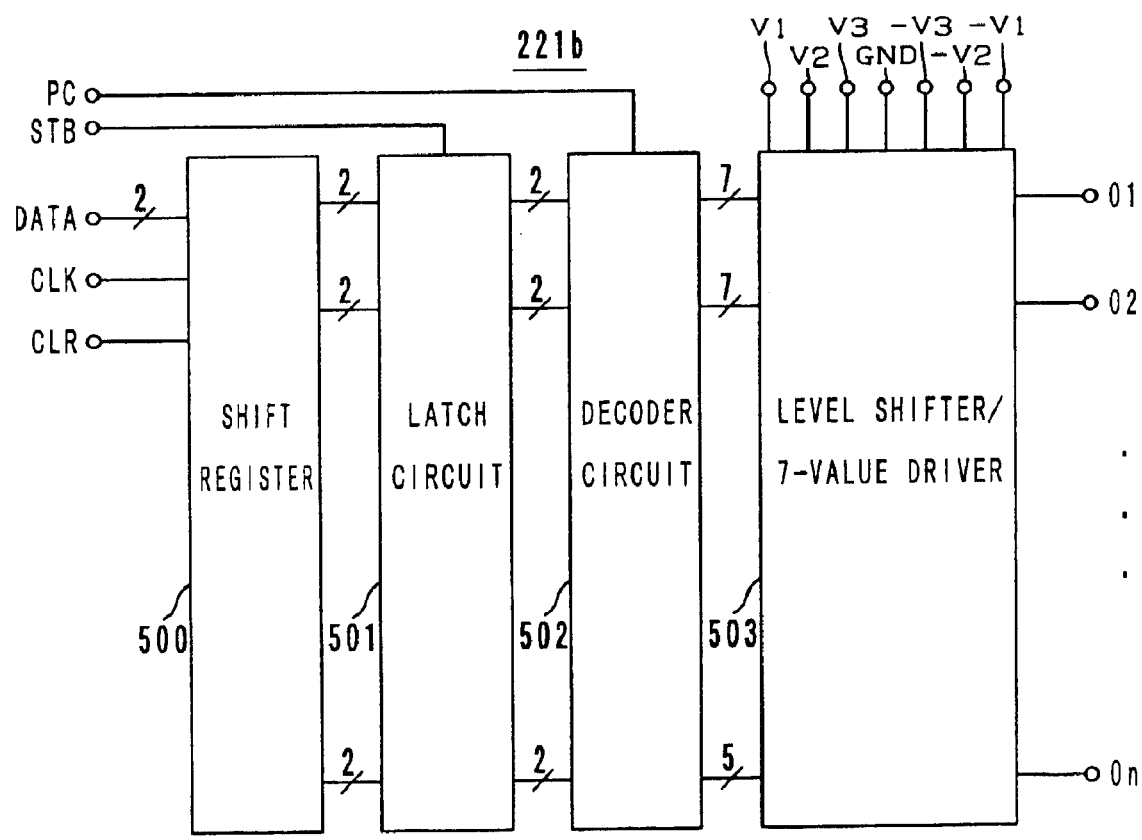
F I G. 42

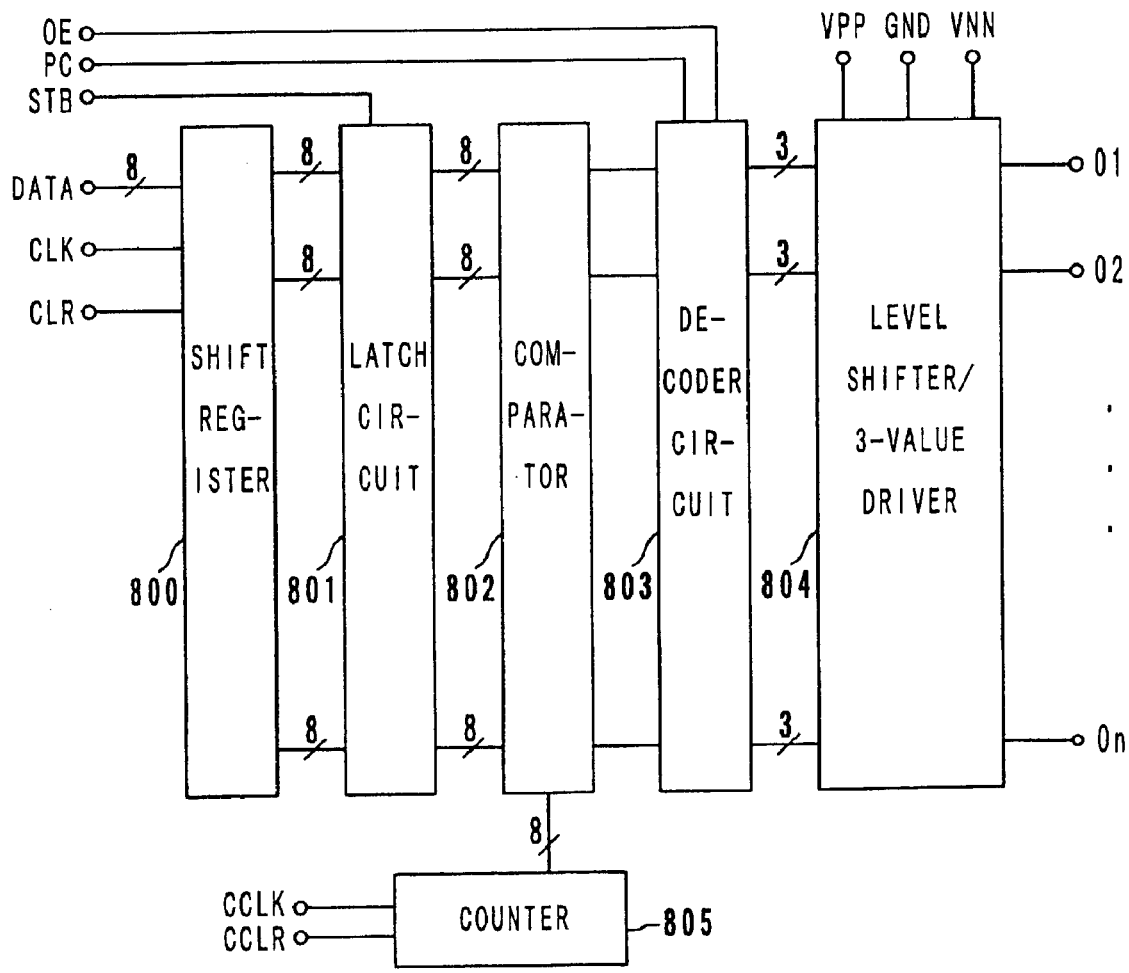
F I G. 44

F I G. 4 5
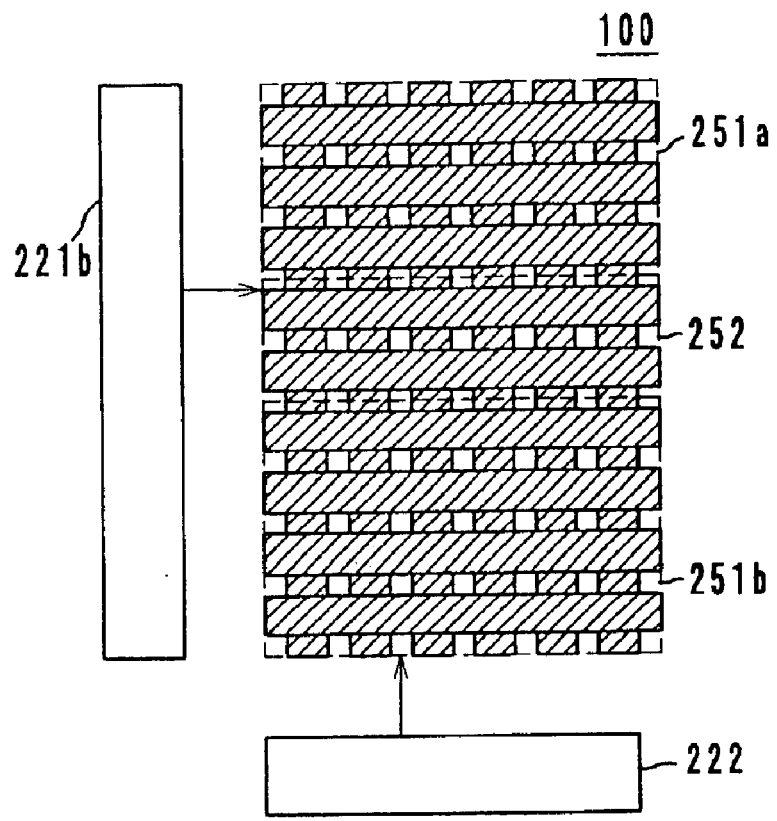
F I G. 4 6 a  F I G. 4 6 b
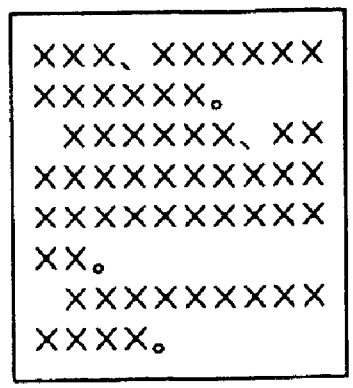 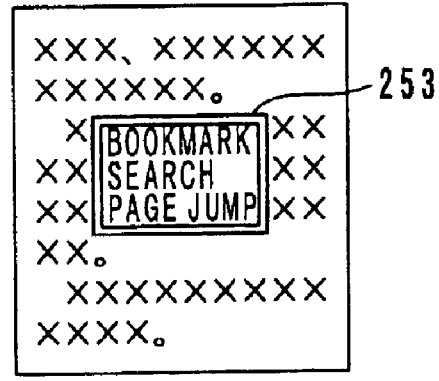

INFORMATION DISPLAY APPARATUS

This application is based on application Nos. 11-093007, 11-279074 and 11-161939 filed in Japan, the content of which is hereby incorporated by reference.

BACKGROUND OF THE INVENTION

1. Field of the Invention

The present invention relates to an information display apparatus, and more particularly to an information display apparatus which has a display area at least part of which is a liquid crystal display which uses liquid crystal with a memory effect, especially liquid crystal which exhibits a cholesteric phase.

2. Description of Related Art

In recent years, apparatuses which simultaneously display relatively unchangeable information such as an advertisement and changeable information such as news are demanded. In order to display information which changes at a high speed, a display which can write a picture thereon at a high speed must be used. Conventional displays of this type are a CRT display and a liquid crystal display which has TFTs (thin film transistors) for the respective pixels so that TN liquid crystal can be driven by an active matrix driving method. In such a display suitable for a motion picture, the whole screen is controlled for writing. More specifically, the whole screen is scanned in one direction at specified times for writing.

Such a conventional display which is suited to display a motion picture has a disadvantage of consuming great electric power. Also, a liquid crystal display using TFTs is expensive. When the display has a large number of pixels, it is very expensive. With respect to a CRT display, thinning of the display is difficult.

In the meantime, as a PDA or a portable terminal unit such as a portable telephone, a device which is small, light, easy to carry and consumes little battery to be usable for a long time is demanded. At present, however, than the body itself of such a device, its display section and electric source section consume greater electric power, which necessitates the use of a large volume of battery.

Thus, practical use of a display which consumes little electric power is demanded. The present inventors have developed displays using chiral nematic liquid crystal. Chiral nematic liquid crystal is bistable and has a memory effect. Accordingly, without application of a voltage, such a display can continue displaying a picture thereon, and it is possible to reduce the consumption of electric power. At present, in order to cause this kind of liquid crystal to make a phase transition, a relatively high voltage is necessary; therefore, a simple matrix driving method, not the active matrix driving method using TFTs, is adopted. Because the simple matrix driving method is adopted, even if the display has a large number of pixels, it is not expensive.

When chiral nematic liquid crystal is driven by a simple matrix driving method, however, it takes a relatively long time for writing on the whole screen. It is, therefore, difficult to display a motion picture on the whole screen of such a display when the screen has a large number of pixels.

SUMMARY OF THE INVENTION

In order to solve the above problems, an object of the present invention is to provide an improved information display apparatus.

Another object of the present invention is to provide an information display apparatus which is suited to display both a motion picture and a still picture.

Another object of the present invention is to provide an information display apparatus which can be produced at low cost and consumes little electric power although having a large screen (having a large number of pixels) and is capable of reproducing a motion picture.

Further, another object of the present invention is to provide an information display apparatus which can make a display appropriate for the purpose.

In order to attain the objects, an information display apparatus according to the present invention comprises: a liquid crystal display having a plurality of liquid crystal pixels defined by a plurality of scan electrodes and a plurality of data electrodes; a driver which is connected to said scan electrodes and said data electrodes to drive said liquid crystal display; and a controller which is connected to said driver, said controller being capable of controlling said driver to select only part of scan electrodes to perform writing on only part of the pixels of the liquid crystal display corresponding to the selected scan electrodes.

Even if the liquid crystal display is a chiral nematic liquid crystal display which is driven by a matrix driving method, which requires a long time for writing on a large screen, by using only part of the screen, which is divided along the direction of the scan electrodes, for writing, the writing can be completed within a short time, and even a motion picture can be displayed without giving any strange feeling to the observer. For example, if it takes 1 msec for writing on one line, by using only 50 lines as a motion picture display area, it takes 0.05 sec for writing on the area, which is short enough as a writing time for a motion picture.

Thus, according to the present invention, even if a chiral nematic liquid crystal display driven by a matrix driving method, which requires a relatively long time for writing thereon, is used, by using part of the screen as a motion picture display area and using the other part as a still picture display area, an effective and impressive display can be made. When chiral nematic liquid crystal is used, it takes approximately 1 msec for writing on one line, and a large-screen display (with a large number of pixels) can be produced at low cost. Further, because the display has a memory effect, the still picture display area consumes electric power only during writing.

Another information display apparatus according to the present invention comprises: a display having a first display area and a second display area which are different from each other in time required for writing thereon.

In the information display apparatus, since the time required for writing in the first display area and the time required for writing in the second display area are different from each other, it is possible to use these display areas independently depending on the content of information. For example, a still picture is displayed in either of the display areas which requires a longer time for writing, while information to be written at a high speed such as a motion picture, information inputted by the operator, etc. is displayed in the other area which requires a shorter time for writing. Thus, different types of displays which attain the respective purposes can be made on one screen.

Another information display apparatus according to the present invention comprises: a first display which displays an image by using a first displaying method; and a second display which displays an image by using a second displaying method, said second display being a reflective type liquid crystal display and being capable of keeping the image thereon without consuming electric power.

BRIEF DESCRIPTION OF THE DRAWINGS

These and other objects and features of the present invention will be apparent from the following description with reference to the accompanying drawings, in which:

FIG. 5 is an illustration which shows an exemplary picture on the display;

FIG. 6 is an illustration which shows an example of displaying motion pictures in a plurality of areas;

FIG. 13 is a block diagram which shows a driving/image processing circuit of the liquid crystal display;

FIG. 19 is a front view of a PDA which is the fourth embodiment of the present invention;

FIG. 20 is a schematic sectional view of a lid of the PDA;

FIGS. 22a through 22d are illustrations which show a way of displaying information on the PDA;

FIG. 23 is an illustration which shows another way of displaying information on the PDA;

FIG. 24 is a front view of a mobile type terminal unit which is the fifth embodiment of the present invention;

FIGS. 25a and 25b are illustrations which show a way of displaying information on the mobile type terminal unit;

FIGS. 26a and 26b are illustrations which show another way of displaying information on the mobile type terminal unit;

FIG. 27 is a front view of a watch type terminal unit which is the sixth embodiment of the present invention;

FIG. 29 is a front view of an information display apparatus which is the seventh embodiment of the present invention;

FIG. 30 is the sectional view of the information display apparatus which is the seventh embodiment;

FIG. 31 is a front view of an information display apparatus which is the eighth embodiment of the present invention;

FIG. 32 is a schematic sectional view of the information display apparatus which is the eighth embodiment;

FIG. 39 is a block diagram of a driving section of an information display apparatus which is the fifteenth embodiment of the present invention;

FIG. 42 is a block diagram of the internal circuit of a second scan driver;

FIG. 44 is a block diagram of the internal circuit of a data driver,

FIG. 45 is a block diagram of a driving section of an information display apparatus which is the sixteenth embodiment of the present invention;

FIGS. 46a and 46b are illustrations which show a way of displaying information on the information display apparatus which is the sixteenth embodiment.

DETAILED DESCRIPTION OF THE PREFERRED EMBODIMENTS

Some embodiments of information display apparatuses according to the present invention are described with reference to the accompanying drawings.

First Embodiment; See FIGS. 1 Through 13

Structure and Control of Information Display Apparatus

Figure 1:
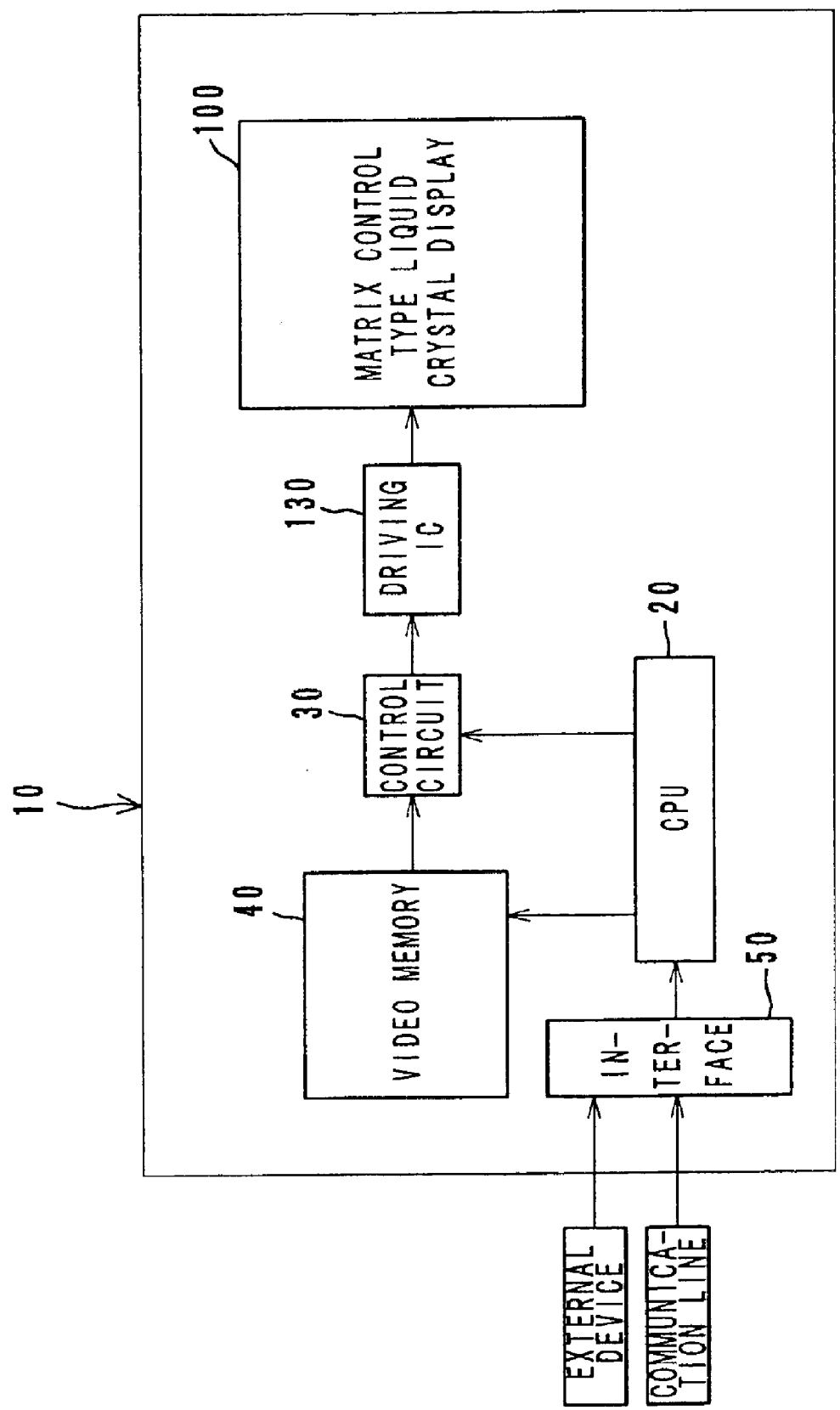
FIG. 1 is a schematic structural view of an information display apparatus which is the first embodiment of the present invention.

FIG. 1 shows an information display apparatus 10 as the first embodiment of the present invention. This apparatus 10 has a liquid crystal display 100 of a matrix control type which is driven by a driving IC 130 controlled by a control circuit 30 by order of a CPU 20. The apparatus 10 further has a video memory 40. The liquid crystal display 100 is three-layered, and each layer is a cell which comprises a substrate with scan electrodes formed thereon, a substrate with data electrodes formed thereon and chiral nematic liquid crystal filled between the substrates. This display 100 displays a full-color image. The structure of the liquid crystal display 100 will be described in detail later.

The CPU 20 receives image data and display area data from an external device such as a personal computer or a communication line and judges the image data whether to be data of a still picture or to be data of a motion picture. Then, the CPU 20 transmits the image data to specified addresses in the video memory 40. The CPU 20 also sends information about the display area and information that the image data are of a still picture or of a motion picture to the control circuit 30.

In the video memory 40, all the information to be displayed on the liquid crystal display 100 is stored. This video memory 40 has addresses corresponding to all the pixels of the liquid crystal display 100. Information about the density and the color of each pixel is stored in the corresponding addresses of the video memory 40 as bit data. The control circuit 30 controls the driving IC 130 in accordance with the information stored in the video memory 40 to write an image on the liquid crystal display 100.

Figure 2:
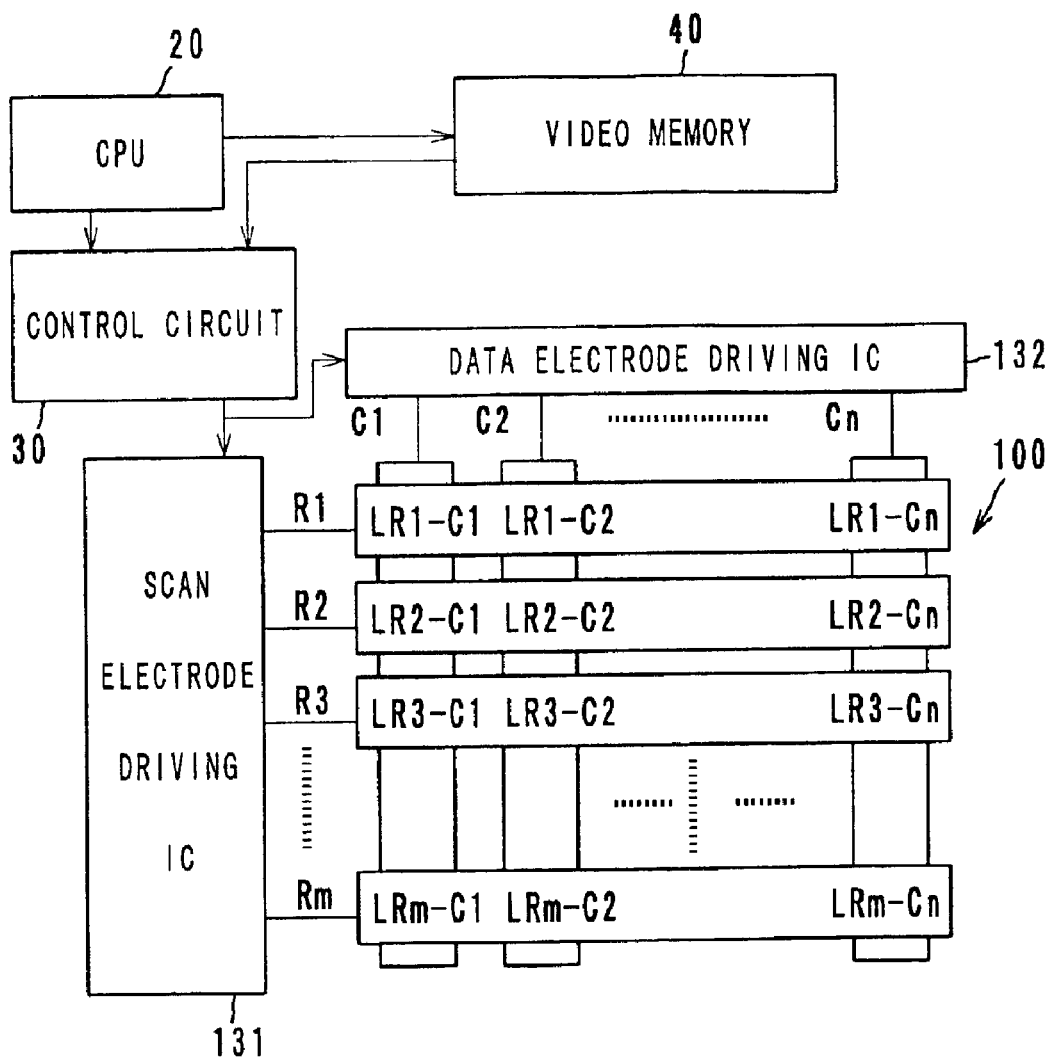
FIG. 2 is a block diagram which shows a matrix driving circuit of a liquid crystal display employed in the information display apparatus.

The pixels on each layer of the liquid crystal 100, as FIG. 2 shows, are structured by a matrix composed of a plurality of scan electrodes R1, R2 through Rm and a plurality of data electrodes C1, C2 through Cn (n, m: natural numbers). The scan electrodes R1, R2 through Rm are connected to output terminals of a scan electrode driving IC 131, and the data electrodes C1, C2 through Cn are connected to output terminals of a data electrode driving IC 132. As the scan electrode driving IC 131 and the data electrode driving IC 132, conventional ICs comprising a shift register a latch circuit and a switch circuit for voltage application are usable. Each layer of the liquid crystal display 100 has such a pixel structure and such driving ICs.

The scan electrode driving IC 131 sends a selective signal to a specified one of the scan electrodes R1, R2 through Rm while sending a non-selective signal to the other scan electrodes. The scan electrode driving IC 131 sends the selective signal to the scan electrodes R1, R2 through Rm in order at regular time intervals. In the meantime, the data electrode driving IC 132 sends signals corresponding to image data to the data electrodes C1, C2 through Cn simultaneously for writing on the respective pixels. For example, while a scan electrode Ra is selected (a: natural number, $a \leq m$), the pixels LRa-C1 through LRa-Cn at the intersection of the scan electrode Ra and the data electrodes C1, C2 through Cn are simultaneously subjected to writing. In each of the pixels, the voltage difference between the scan electrode and the data electrode is a voltage for writing on the pixel, and writing on each pixel is performed by this writing voltage.

If the threshold voltage to untwist liquid crystal which exhibits a cholesteric phase (first threshold voltage) is Vth1, by applying the voltage Vth1 to the liquid crystal for a sufficient time and thereafter dropping the voltage to less than a second threshold voltage Vth2 which is lower than the first threshold voltage Vth1, the liquid crystal comes to the planar state. By applying a voltage which is higher than Vth2 and lower than Vth1 for a sufficient time, the liquid crystal comes to the focal-conic state. Each of the states is maintained even after stoppage of application of the voltage. It has been found that such liquid crystal also comes to a state where these two states are mixed, which means that the liquid crystal can make a gray scale display.

Figure 3:
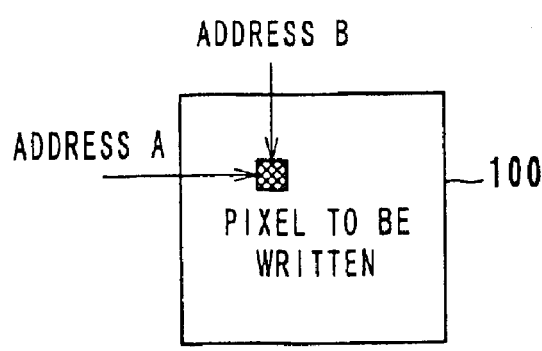
FIG. 3 is an illustration which shows display coordinates.

The control circuit 30 designates combinations of an address in a row direction (scan line) and an address in a column direction (data line) in order. As FIG. 3 shows, when the control circuit 30 designates addresses A and B, the display coordinate (A, B) which is the combination of these addresses is subjected to writing in accordance with data read from an address in the video memory 40 corresponding to the display coordinate (A, B).

Figure 4:
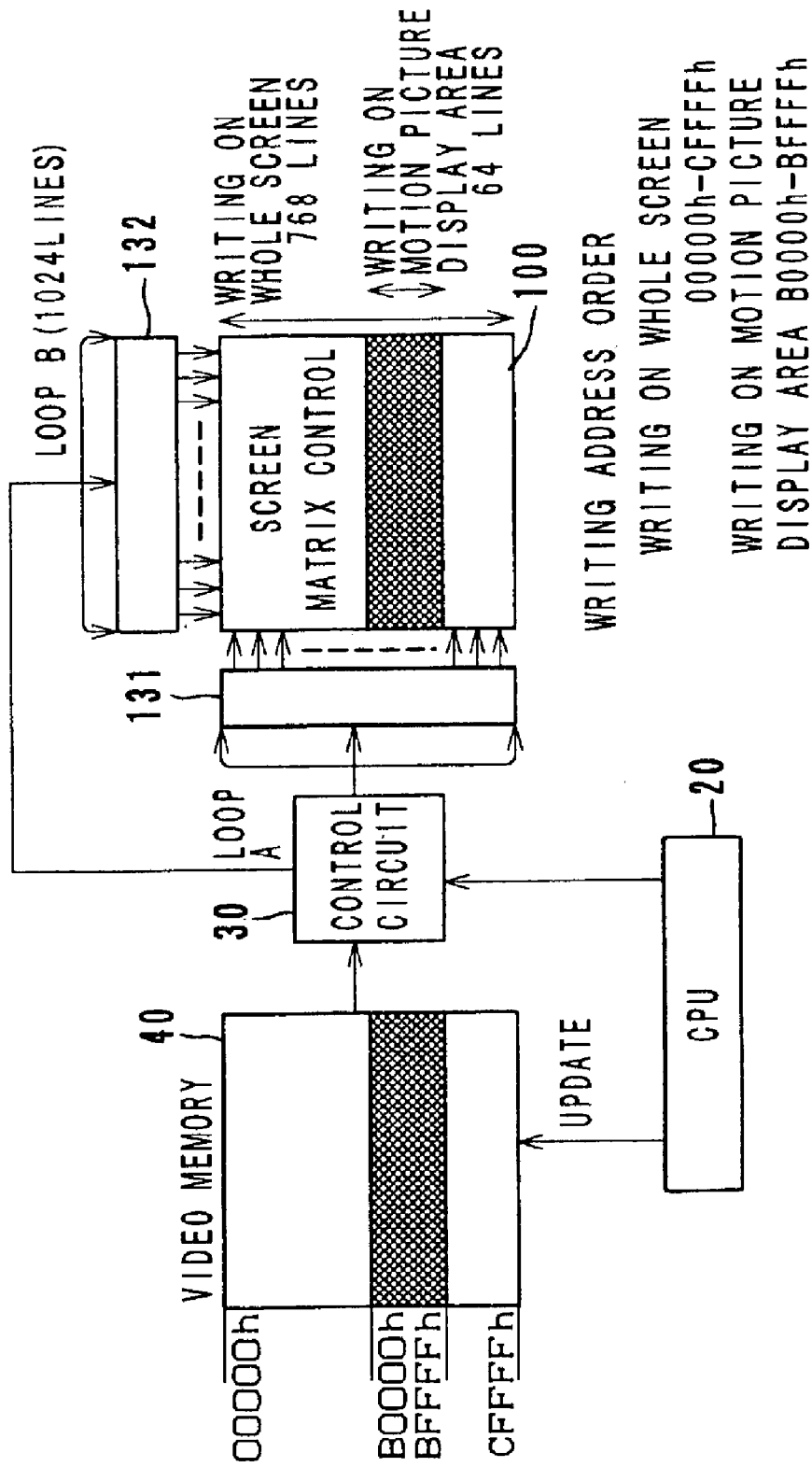
FIG. 4 is an illustration which shows display control.

FIG. 4 shows this control in more detail. Here, the liquid crystal display 100 has 1024 pixels in each row (scan line) and 768 pixels in each column (data line). Each of the pixels is capable of displaying one byte of (256) tones or colors. The video memory 40 has 786432 (1024×768) addresses 00000h through CFFFFh, and its capacity is 786432 bytes. The liquid crystal display 100 has addresses A0 through A767 in the column direction and addresses B0 through B1023 in the row direction.

When writing is to be performed on the whole screen, the CPU 20 sends a writing address order of 00000h through CFFFFh to the control circuit 30. The control circuit 30 designates these addresses in order as display addresses A and B. An address N in the video memory 40 is converted into display addresses A and B, for example, by using the following expressions. In the expressions, "INT" means taking only the integral part of the calculated value, and "MOD" means taking the surplus of the result.

$$A = INT(N/1024)$$

$$B = MOD(N/1024)$$

Data to be written on display addresses B on a scan electrode corresponding to a display address A are read out from the video memory 40 in order and are latched in a latch circuit of the control circuit 30. Then, while controlling the scan electrode driving IC 131 to select the scan electrode corresponding to the address A, the control circuit 30 controls the data electrode driving IC 132 to write one line in accordance with the latched data.

On the other hand, when writing is to be performed on only part of the screen, the CPU 20 sends a writing address order indicating part of the addresses of the video memory 40 to the control circuit 30. For example, only serial 64 scan lines on the screen are to be subjected to writing, the CPU 20 sends a writing address order of B0000h through BFFFFh to the control circuit 30. Accordingly, while from the scan electrodes R1 through Rm, only 64 scan electrodes corresponding to the lines to be written are selected one by one repeatedly, the data electrode driving IC 132 applies a data signal to the data electrodes selectively in accordance with the data for the selected line repeatedly. Selecting only the 64 lines in order is realized by controlling data supplied to the shift register. With this control, in an area composed of the 64 lines, a motion picture can be displayed.

In this embodiment, the information display apparatus receives motion picture data and also display area data from an external device such as a personal computer, a communication line or the like via an interface 50, and in accordance with the display area data, the writing start line and the writing end line are determined. Needless to say, the display area may be fixed, and in this case, display area data are not sent from the external device or the communication line.

Thus, by determining a writing start line and a writing end line and by writing a motion picture within the area from the writing start line to the writing end line, it is possible to shorten the time intervals among writing cycles. In the liquid crystal display 100 using chiral nematic liquid crystal, it takes typically approximately 1 msec for writing on one line although the time differs depending on the materials of the liquid crystal composition and the driving signal waveform. Accordingly, if writing is performed in an area composed of 64 lines, it takes approximately 64 msec for one writing cycle, that is, approximately 15 cycles of writing can be performed per second. When images are written at time intervals in such an extent, they can be seen as a motion picture although slight flickering is recognized.

Thus, the number of scan electrodes to be used for a motion picture is limited beforehand to such a value that images written thereon can be recognized as a motion picture. Display area data of a motion picture sent from an external device indicate an area composed of a number of scan electrodes not beyond the limit.

Further, in the middle of performing continuous writing on part of the screen, the part of the video memory 40 containing data for the other part of the screen can be updated by the CPU 20. However, the new data are not displayed immediately, and the data are used to write on the whole screen next time.

In the above-described control, one byte of data is used for one pixel, but for a display of a full-color image, three bytes of data are used for one pixel. In this case, although the volume of data to be stored is three times, other processes are performed in the same way. Otherwise, three memories may be provided for the red, green and blue display layers, respectively. In either case, in displaying a motion picture, the display layers are driven simultaneously, which results in a motion picture of a high quality without color dislocation.

By performing partial writing control on one screen as described above, for example, a picture shown by FIG. 5 can be displayed. A still picture display area which is a larger part of the screen is not subjected to writing so often, and writing on this area is performed at relatively long regular intervals, for example, once a day. On the other hand, a motion picture display area which is a strip-like area in the lower part of the screen receives data from the video memory 40 continuously, and changeable information (news, motion characters, etc.) is displayed in this area.

One screen does not always have only one motion picture display area. As FIG. 6 shows, it is possible to provide a plurality of motion picture display areas on one screen. In this case, the CPU 20 sends data indicating a plurality of writing start lines and a plurality of writing end lines to the control circuit 30. In the above-described address structure, if display area data indicating an area from A8000h to AFFFFh and data indicating an area from C0000h to C7FFFh are sent, motion pictures are displayed in the areas composed of these scanning lines. In this example, each of the motion picture display areas is composed of 32 lines. Accordingly, the total of 64 lines are subjected to continuous writing, and 15 writing cycles are performed per second. In a case of providing a plurality of motion picture display areas on one screen, the total number of scanning lines of all the motion picture display areas shall be within the limit in which images written on the areas can be recognized as motion pictures.

Liquid Crystal Display

Next, a liquid crystal display using liquid crystal which exhibits a cholesteric phase is described.

Structure

Figure 7:
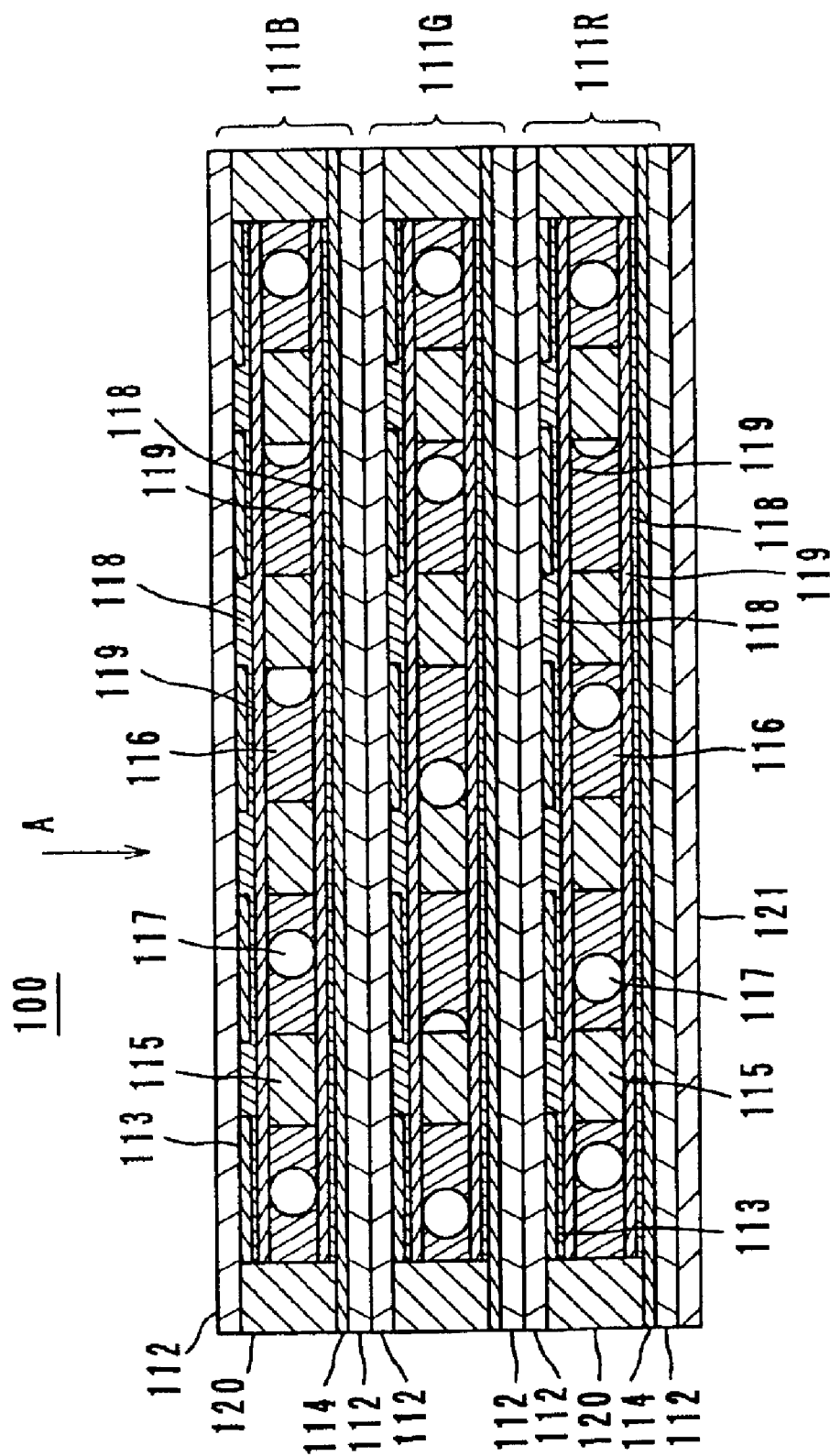
FIG. 7 is a sectional view of an exemplary liquid crystal display used as the display.

FIG. 7 shows an exemplary structure of a liquid crystal display 100. This liquid crystal display 100 is of a reflective type, and has, on a light absorber 121, a red display layer 111R which makes a display by switching between a red selective reflection state and a transparent state. On the red display layer 111R, a green-display layer 111G which makes a display by switching between a green selective reflection state and a transparent state is provided, and on the layer 111G, a blue display layer 111B which makes a display by switching between a blue selective reflection state and a transparent state is provided.

Each of the display layers 111R, 111G, and 111B has a resin columnar structure 115, liquid crystal 116 and spacers 117 between transparent substrates 112 with transparent electrodes 113 and 114, respectively, thereon. On the transparent electrodes 113 and 114, an insulating layer 118 and an alignment controlling layer 119 are provided if necessary. A sealant 120 is provided on the periphery of the substrates 112 to seal the liquid crystal 116 in the substrates 112.

The transparent electrodes 113 and 114 of each display layer are connected to the control circuit 30, and a specified pulse voltage is applied between the electrodes 113 and 114. In response to the voltage applied, the liquid crystal 116 switches between a transparent state wherein the liquid crystal 116 transmits visible light and a selective reflection state wherein the liquid crystal 116 selectively reflects visible light of a specified wavelength, thereby switching a display.

The transparent electrodes 113 and 114 of each display layer are in the form of strips arranged in parallel at slight uniform intervals. The electrode strips 113 and the electrode strips 114 face each other, and the extending direction of the electrode strips 113 and the extending direction of the electrode strips 114 are perpendicular to each other. Electric power is applied between the upper electrode strips and the lower electrode strips in order. Accordingly, in each display layer, a voltage is applied to the liquid crystal 116 in a matrix, so that the liquid crystal 116 makes a display. This is referred to as a matrix drive. By performing this matrix drive toward the display layers sequentially or simultaneously, the liquid crystal display 100 displays a full-color image.

A liquid crystal display with liquid crystal which exhibits a cholesteric phase between two substrates makes a display by switching the liquid crystal between a planar state and a focal-conic state. In the planar state, the liquid crystal selectively reflects light of a specified wavelength $\lambda=Pn$ (P: helical pitch of the cholesteric liquid crystal, n: average refractive index of the liquid crystal). In the focal-conic state, if the wavelength of light selectively reflected is shorter than the infrared spectrum, the liquid crystal transmits visible light. Therefore, by setting the wavelength of light selectively reflected by the liquid crystal within the visible spectrum and providing a light absorbing layer on the side of the display opposite the observing side, the liquid crystal, in the planar state, makes a display of a color corresponding to the wavelength of light selectively reflected and in the focal-conic state, makes a black display. Also, by setting the wavelength of light selectively reflected by the liquid crystal within the infrared spectrum and providing a light absorbing layer on the side of the display opposite the observing side, the liquid crystal, in the planar state, reflects infrared light and transmits visible light, thereby making a black display, and in the focal-conic state, scatters light, thereby making white display.

Full-color Display

The liquid crystal display 100 which has color display layers 111R, 111G and 111B makes a red display by setting the liquid crystal 116 of the blue display layer 111B and the green display layer 111G to the focal-conic (transparent) state and setting the red display layer 111R to the planar (selective reflection) state. The liquid crystal display 100 makes a yellow display by setting the liquid crystal 116 of the blue display layer 111B to the focal-conic (transparent) state and setting the liquid crystal 116 of the green display layer 111G and the red display layer 111R to the planar (selective reflection) state. By setting the liquid crystal 116 of the respective color display layers to the transparent state or to the selective reflection state appropriately, displays of red, green, blue, white, cyan, magenta, yellow and black are possible. Also, by setting the liquid crystal 116 of the respective color display layers to an intermediate state, displays of intermediate colors are possible. Thus, the liquid crystal display 100 can be used as a full-color display.

The laminating order of the color display layers 111R, 111G and 111B in the liquid crystal display 100 is not limited to the order shown by FIG. 7, and the other orders are possible. However, considering that light in a longer wavelength range is easier to be transmitted than light in a shorter wavelength, it is good to arrange the layer which selectively reflects light of a shorter wavelength in an upper position than the layer which selectively reflects light of a longer wavelength. With this arrangement, more light transmits downward, and a brighter display becomes possible. Accordingly, it is the best for good display performance to arrange the blue display layer 111B, the green display layer 111G and the red display layer 111R in this order viewing from the observing direction (indicated by arrow "A").

Materials for the Display

As the transparent substrates 112, transparent glass plates and transparent resin films can be used. As the transparent resin films, polycarbonate resin, polyether sulfone resin, polyethylene terephthalate resin, norbornene resin, polyalylate resin, amorphous polyolefine resin, modified acrylate resin, etc. can be named. Such resin films used as the transparent substrates 112 are required to have the following characteristics: high light transmittance, optical non-anisotropy, dimensional stability, surface smoothness, antifriction, elasticity, high electric insulation, chemical resistance, liquid crystal resistance, heat resistance, moisture resistance, gas barrier function, etc. A material which has such necessary characteristics is selected depending on the circumstances and the usage.

As the transparent electrodes 113 and 114, ITO (indium tin oxide), etc. are usable. Metal electrodes of aluminum, silicon or the like can be used, and photoconductive films of amorphous silicon, BSO (bismuth silicon oxide) or the like can be used. The lowermost electrodes 114 may be preferably black electrodes so as to function as a light absorber.

The insulating layers 118 are inorganic films of silicon oxide or the like or organic films of polyimide resin, epoxy resin or the like so as to also function as gas barriers. The insulating layers 118 prevent short-circuits among the substrates 112 and improve the reliability of the liquid crystal 116. The alignment controlling layers 119 are typically made of polyimide.

Preferably, the liquid crystal 116 exhibits a cholesteric phase in a room temperature. Chiral nematic liquid crystal which is produced by adding a chiral agent to nematic liquid crystal is especially suited as the liquid crystal 116.

A chiral agent is an additive which twists molecules of nematic liquid crystal. When a chiral agent is added to nematic liquid crystal, the liquid crystal molecules form a helical structure with uniform twist intervals, whereby the nematic liquid crystal exhibits a cholesteric phase.

By changing the content of the chiral agent in chiral nematic liquid crystal, the pitch of the helical structure can be changed. In this way, the wavelength of light to be selectively reflected by the liquid crystal can be controlled. Generally, the pitch of the helical structure is expressed by a term "helical pitch" which is defined as the distance between molecules which are located at 360° to each other along the helical structure of the liquid crystal molecules.

The columnar structures 115 can be made of, for example, thermoplastic resin. Such thermoplastic resin used for the columnar structures 115 is required to be softened by heat and solidified by cool, not to chemically react to the liquid crystal material used and to have appropriate elasticity.

Specifically, polyvinyl chloride resin, polyvinilidene chloride resin, polyester methacrylate resin, polyacrylic ester resin, polyvinyl acetate resin, polystyrene, resin, polyamide resin, polyethylene resin, polypropylene resin, fluororesin, polyurethane resin, polyacrylonitrile resin, polyvinyl ether resin, polyvinyl ketone resin, polyvinyl pyrolidone resin, polycarbonate resin, chlorinated polyether resin, saturated polyester resin, etc. can be used.

One of these materials may be used by itself, or a plurality of these materials may used by mixture. Also, a mixture which at least contains one or more of these materials may be used.

Figure 8:
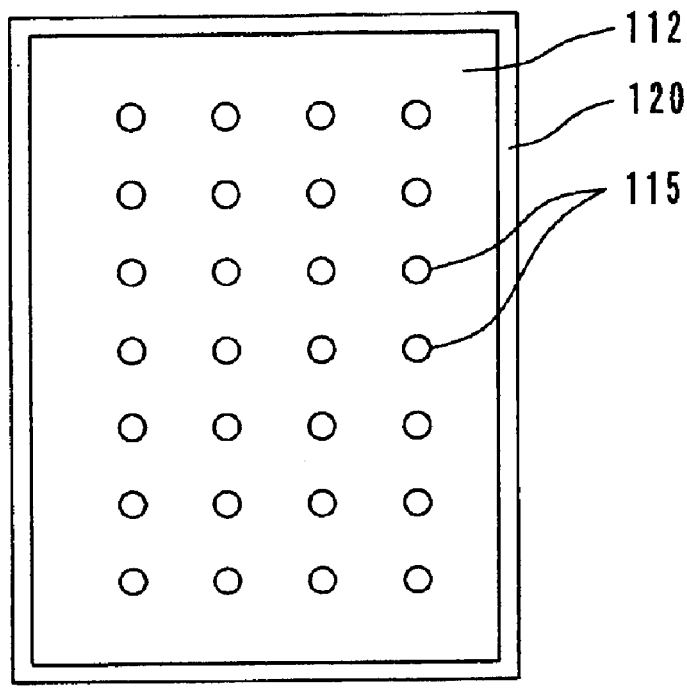
FIG. 8 is a plan view of the liquid crystal display which shows a state wherein a columnar structure and a sealant are formed on a substrate.

As FIG. 8 shows, such a material is printed into a pattern of dotted columns by a conventional printing method. The size, the arrangement pitch, the shape (cylinder, drum, square pole, etc.) of the columns are determined depending on the size and the image resolution of the liquid crystal display. If the columns are arranged between the electrode strips 113, the actual display area will be large, which is favorable.

The spacers 117 are preferably particles of a rigid material which are not deformed by heat and/or pressure. For example, the spacers 117 are fine glass fiber, balls of silicate glass, inorganic powder such as aluminum powder or spherical particles of an organic synthetic material such as divynilbenzene bridged polymer polystyrene bridged polymer or the like.

By providing the rigid spacers 117 and the resin structure 115 which is of a material which mainly contains thermoplastic polymer and composed of columns arranged in a specified pattern between two substrates 112, the two substrates are wholly supported firmly with the gap maintained evenly. Also, alignment unevenness of the liquid crystal 116 filled therein and an occurrence of bubbles in the liquid crystal 116 under a low temperature can be prevented.

Exemplary Producing Method of the Liquid Crystal Display

An exemplary producing method of the liquid crystal display 100 is described briefly.

First, on two transparent substrates, a plurality of electrode strips are formed. The electrodes are formed by forming an ITO film on each substrate by sputtering or the like and thereafter patterning the ITO film by photolithography.

Next, a transparent insulating layer and a transparent alignment controlling layer are provided on the transparent electrodes of each substrate. The insulating layer and the alignment controlling layer can be formed of an inorganic material such as silicon oxide or an organic material such as polyimide resin by a conventional method such as spin-coat method or a roll-coat method.

On the alignment controlling layer, usually, a rubbing treatment is not performed. Although the function of the alignment controlling layer has not been cleared yet, the liquid crystal molecules obtain an anchoring effect because of the alignment controlling layer. Thus, degradation of the characteristics of the liquid crystal display with aging can be inhibited. It is possible to add a coloring agent to the materials of these thin layers so as to impart a function as a color filter to these layers, which results in improvements in color purity and contrast.

In this way, transparent electrodes, insulating layers and alignment controlling layers are provided on the two substrates. On one of the substrates, a resin structure is formed on the surface with the electrodes thereon. For the resin structure, paste of resin material which is prepared by dissolving resin in a solvent is used. A printing method wherein the paste of resin material is extruded from a squeegee onto the substrate placed on a flat plate via a screen, a metal mask or the like, a dispenser method or an ink jet method wherein the paste of resin material is injected from a nozzle onto the substrate and a transfer method wherein the paste of resin material is supplied to a flat plate or a roller and thereafter transferred onto the substrate can be adopted. When the resin structure is formed, the resin structure preferably has a greater height than a desired thickness of the liquid crystal layer.

On the other substrate, a sealant of ultra-violet ray setting resin or thermosetting resin is provided on the surface with the electrodes thereon. The sealant is formed into a ring along the periphery of the substrate. As in the formation of the resin structure, the sealant is formed by a dispenser method or an inkjet method wherein resin is injected from a nozzle onto the substrate, a printing method wherein resin is printed on the substrate via a screen, a metal mask or the like or a transfer method wherein resin is supplied to a flat plate or a roller and thereafter transferred onto the substrate. Next, on at least one of the substrates, spacers are dispersed by a conventional method.

Figure 9:
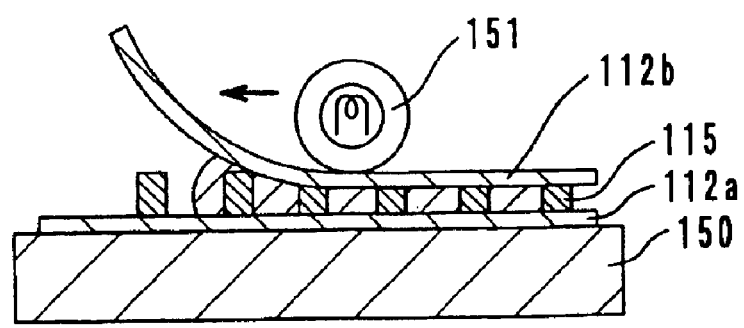
FIG. 9 is an illustration which shows a manufacturing process of the liquid crystal display.

Then, these substrates are laminated with each other and are heated while being pressed from both sides. More specifically, as FIG. 9 shows, for example, the substrate 112a with the resin structure 115 formed thereon is placed on a flat plate 150, and the other substrate 112b is placed on the substrate 112a being pressed by a heating/pressing roller 151 from an end. Thus, the substrates 112a and 112b are heated and pressed while passing between the roller 151 and the plate 150. By adopting such a method, even if the substrates are flexible substrates such as films, a cell can be fabricated accurately. If the resin structure is thermoplastic polymer, the resin structure is softened by heat and hardened by cool, and the substrates adhere to each other because of the resin structure. If the sealant is thermosetting resin, the heat applied for the lamination of the substrates hardens the resin.

In this laminating process, further, the liquid crystal material is dropped on one of the substrates. The liquid crystal material is spread out between the substrates while the substrates are laminated. In this case, the spacers may be contained in the liquid crystal material, and the liquid crystal material containing spacers is dropped on at least one of the substrates on the surface with the electrodes thereon.

The liquid crystal material is dropped on one of the substrates at an end. Then, while the substrates are laminated pressed by the roller, the liquid crystal material is spread from one end to the other end, and in this way, the liquid crystal material is filled in the whole area between the substrates. By adopting this method of filling the liquid crystal material between the substrates, bubbles which occurred during the laminating process are hardly taken in the liquid crystal material.

The substrates are continuously pressed at least until the substrates are cooled to a temperature less than the softening point of the resin material of the columnar structure, and then, the substrates are released from the pressure. If photosetting resin is used as the sealant, light is radiated thereafter so as to harden the resin.

Using different liquid crystal materials which selectively reflect light of different wavelengths, respectively, cells for blue, green and red are fabricated in the same way. The fabricated cells are laminated into three layers and are joined by an adhesive. Further, a light absorber is provided on the bottom, and thus, a full-color liquid crystal display is produced.

Other Liquid Crystal Displays

The above-described liquid crystal display 100 has a resin columnar structure inside a liquid crystal display area. Such a structure permits production of a liquid crystal display which is light and has good display performance although using film substrates. Also, such a liquid crystal display of this structure has various advantages of being easily produced as a large-screen display, of requiring a relatively low driving voltage and of being strong against shock, etc. However, this structure is not necessarily adopted. The liquid crystal display layer may be structured as a conventional polymer dispersed type liquid crystal composite layer, wherein liquid crystal is dispersed in a polymeric three-dimensional net structure or wherein a polymeric three-dimensional net structure is formed in liquid crystal.

First Driving Method

Figure 10:
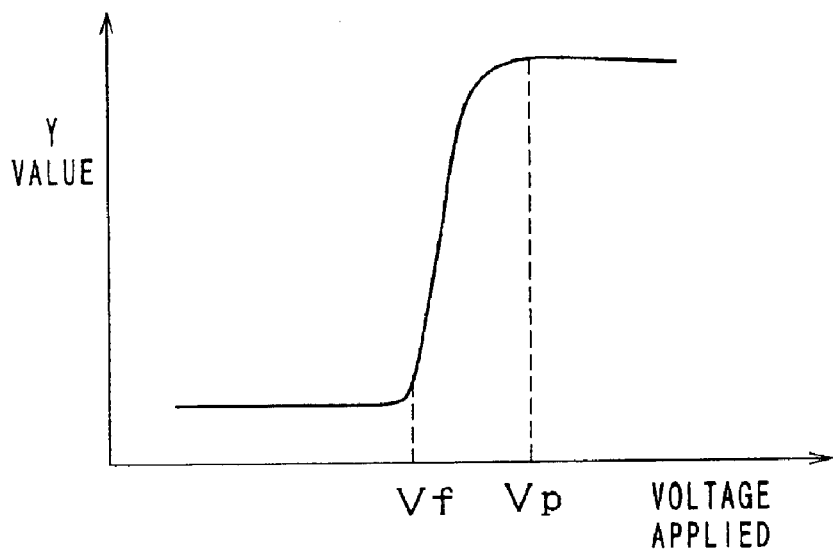
FIG. 10 is a graph which shows the relationship between the voltage of a selective signal applied by the driving circuit and the Y value.

In the liquid crystal display 100, the display state of the liquid crystal is a function of the voltage applied and the pulse width. By resetting the whole liquid crystal to the focal-conic state wherein the liquid crystal shows the lowest Y value (luminous reflectance) and thereafter, applying a pulse voltage with a constant pulse width to the liquid crystal, the display state of the liquid crystal changes as FIG. 10 shows. In the graph of FIG. 10, the y-axis indicates the Y value, and the x-axis indicates the voltage applied. When a pulse voltage Vp is applied, the liquid crystal comes to the planar state wherein the liquid crystal shows the highest Y value, and when a pulse voltage Vf is applied, the liquid crystal comes to the focal-conic state wherein the liquid crystal shows the lowest Y value. Also, when an intermediate pulse voltage between Vp and Vf is applied, the liquid crystal comes to an intermediate state between the planar state and the focal-conic state wherein the liquid crystal shows an intermediate Y value, and thus, a display of an intermediate color is possible.

Figure 11A:
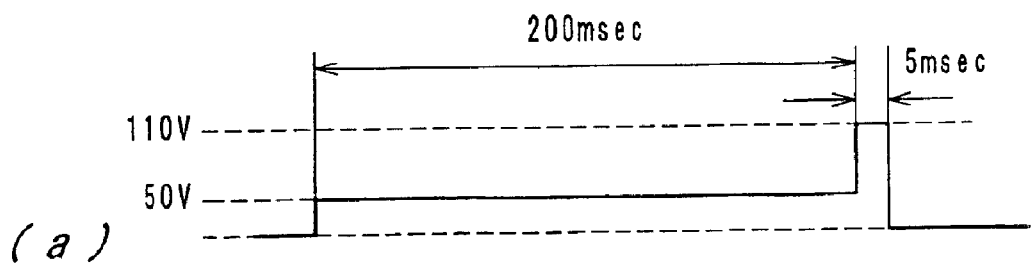
FIGS. 11a and 11b are charts which show voltage waveforms applied to a test cell of the liquid crystal display.
Figure 11B:
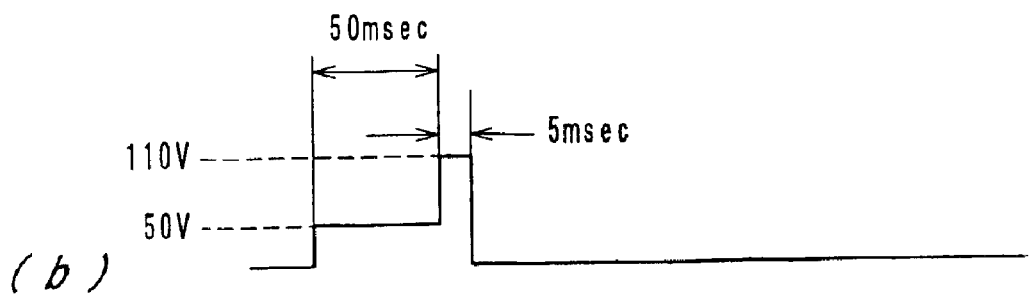

FIGS. 11a and 11b show waveforms (a) and (b) of pulse voltages applied to a test cell produced by the inventors as a trial. In the experiment, only one pixel was subjected. The voltage of a reset signal was 50V. The pulse width of the reset signal (reset duration) was 200 msec in the case of (a) and 50 msec in the case of (b). As the selective signal to set the pixel to the planar state, 110V was applied for 5 msec. Although the voltage of the selective signal was set to 110V in the experiment, the signal may be of any other voltage. The voltage shall be determined depending on the material and the thickness of the liquid crystal and the pulse width of the signal.

In the case of waveform (a) wherein the reset signal was supplied for 200 msec, whether the pixel was previously in the planar state or in the focal-conic state, the pixel came to the planar state in good condition by application of the selective signal, and displays of gray scales were possible by changing the voltage of the selective signal. On the other hand, in the case of waveform (b) wherein the reset signal was supplied for 50 msec, the reset of the pixel was not always sufficient, and when the pixel was set to the planar state thereafter, the Y value varied.

As is apparent from this experiment, as the reset signal application time is set longer, the influence of the previous state of the liquid crystal becomes weaker. In other words, by setting the reset signal application time to be sufficiently long, display renewal can be well done without being influenced by the previous state. In the case of waveform (a), the reset signal application time was 200 msec, and a display with four tones was possible. If the reset signal is supplied for more time, variations in display state caused by the influence of the previous state will be reduced, and a display with more tones will be possible.

Figure 12A:
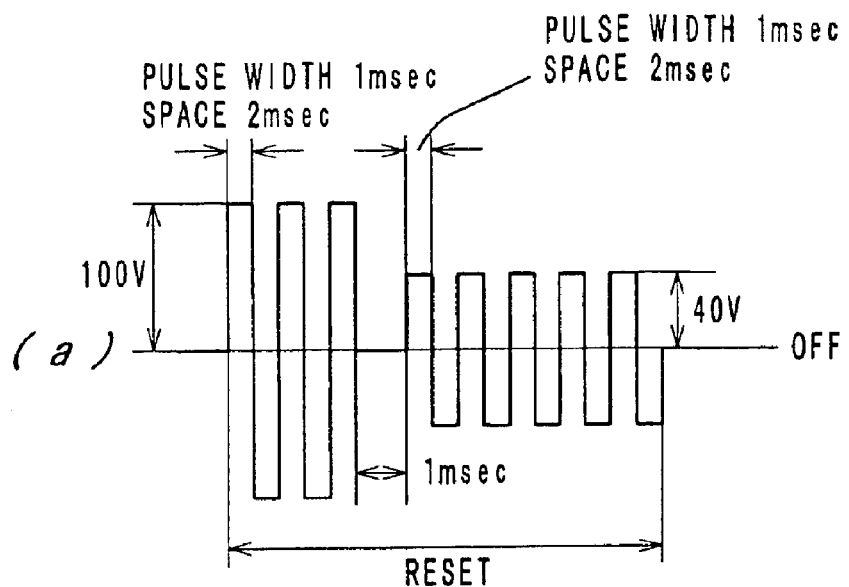
FIGS. 12a and 12b are charts which show a voltage waveform to drive the liquid crystal display.
Figure 12B:
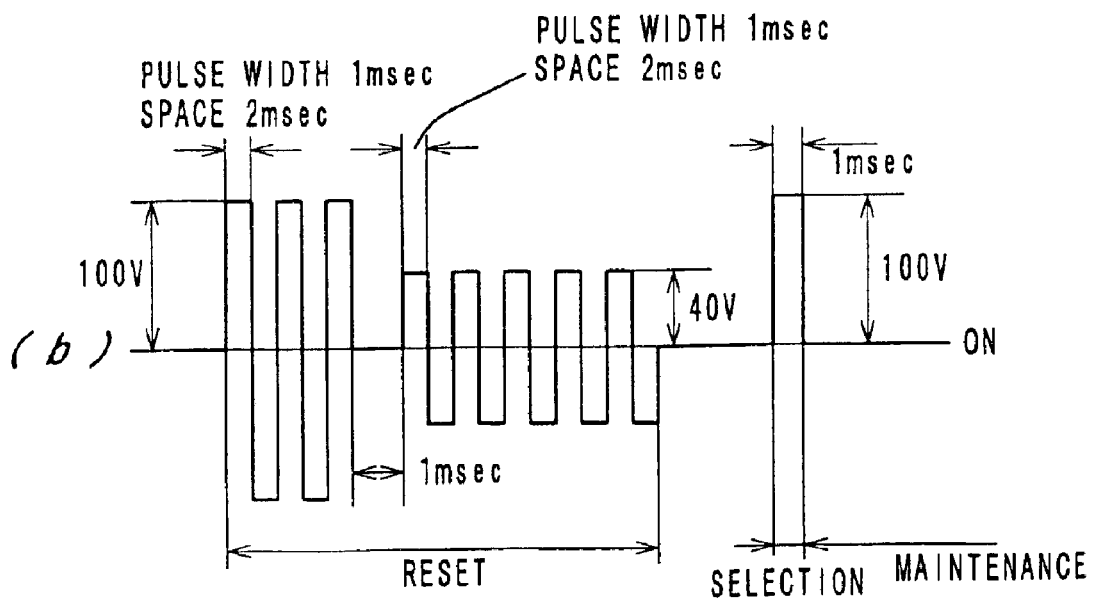

FIGS. 12a and 12b show exemplary waveforms of a voltage applied to the liquid crystal according to a first driving method. FIG. 12a shows a waveform (a) to turn off the liquid crystal display 100. First, a pulse voltage of 100V is applied to set the liquid crystal to a homeotropic state, and then, a pulse voltage of 40V is applied. Thereby, the liquid crystal comes to the focal-conic state, and the state is maintained. In this state, the liquid crystal scatters light incident thereto (off state or reset state).

FIG. 12b shows a waveform (b) to turn on the liquid crystal display 100. After setting the liquid crystal to the reset state in the above-described way, a pulse voltage of 100V is applied to the liquid crystal for 1 msec. Thereby, the liquid crystal comes to the planar state. The liquid crystal keeps in this state after stoppage of the application of voltage and transmits/reflects light incident thereto (on state).

Driving/Image Signal Processing Circuit

FIG. 13 shows a driving/image signal processing circuit 220 wherein image data are erasable and written. The liquid crystal display 100 is connected to a scan driver 221 and a data driver 222, which are controlled by a scan controller 223 and a data controller 224, respectively. Image data to be newly displayed are inputted into the data controller 224 from a memory 226, but before the data input, the image data are converted into a selective signal by an image data converter 225.

Second Embodiment; See FIGS. 14 and 15

Figure 14:
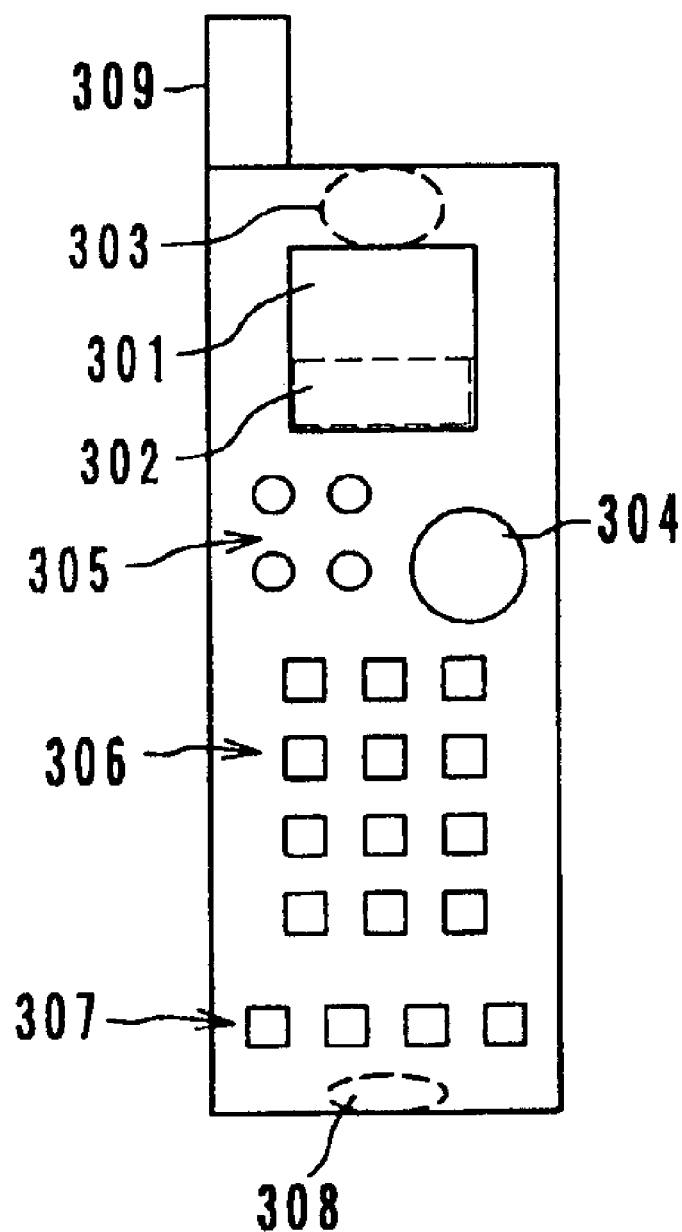
FIG. 14 is a front view of a portable telephone which is the second embodiment of the present invention.

The second embodiment is a portable telephone 300 such as a PHS. As FIG. 14 shows, the portable telephone 300 has a display section composed of a first display 301 and a second display 302. The first display 301 is a reflective type liquid crystal display with a memory effect as shown by FIG. 7. The display 301 may be a full-color display composed of three display layers or a monochromatic display with one display layer. The second display 302 is a liquid crystal display which has nematic liquid crystal to be driven in a TN mode. A TFT (thin film transistor) is provided for every pixel so that the liquid crystal display can be driven by an active matrix driving method. The second display 302 requires a shorter time for writing thereon than the first display 301. The second display 302 may be any other type of display as long as it requires a shorter writing time.

Further, the portable telephone 300 has a speaker 303, a menu dial 304 for mode selection/input, a key group 305 for selection of mail, call, manner or function, a ten-key 306, a key group 307 for selection of letter, clear, memory or memo, a microphone 308 and an antenna 309. The functions of these members are well known.

Figure 15A:
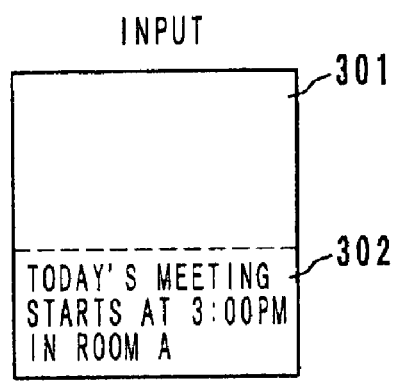
FIGS. 15a through 15e are illustrations which show a way of displaying information on the portable telephone.
Figure 15B:
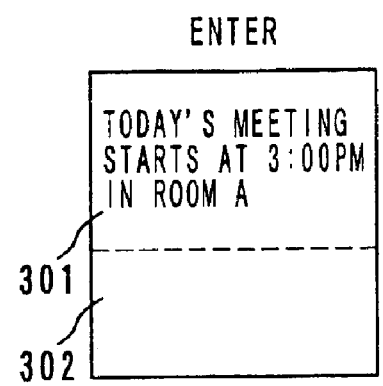
Figure 15C:
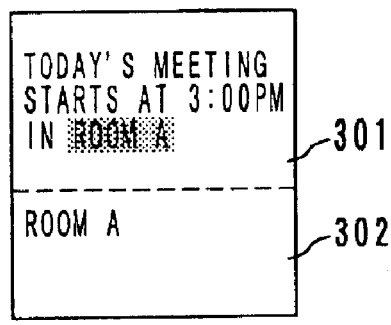
Figure 15D:
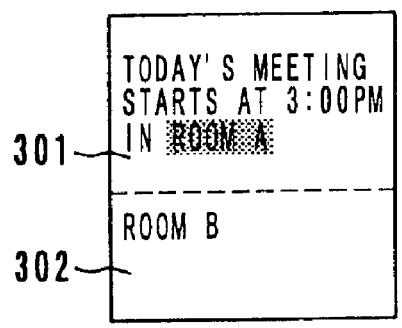
Figure 15E:
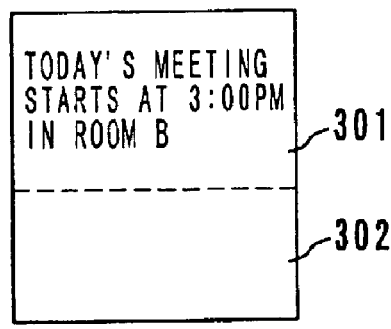

Information is displayed on the first and the second displays 301 and 302 in the following way. When a sentence "Today's meeting starts at 3:00 PM in Room A." is inputted by use of the ten-key 306 and the key group 307, this sentence is displayed on the second display 302 as shown by FIG. 15a. Next, when the user enters this input by use of a specified key, the sentence is moved to the first display 301 (see FIG. 15b). Then, when the information is to be revised, for example, if "Room A" is to be changed to "Room B", the cursor is moved to the part of the information to be changed on the first display 301. Then, when a revision is commanded, the part to be changed, that is, "Room A" is displayed on the second display 302 (see FIG. 15c). In this state, an input to replace "A" with "B" is made (see FIG. 15d), and this revised information is entered by use of a specified key (see FIG. 15e). Thereafter, this information is stored in a memory and/or sent as an e-mail through a telephone line if necessary.

In the second embodiment, since the first display 301 has a memory effect, the picture displayed thereon is maintained even after a power-off (use-up of a battery). Since the second display 302 requires a short writing time, a new image can be displayed thereon with no delay from a key operation. Accordingly, the inputted content can be seen immediately, which is convenient.

When both the first display 301 and the second display 302 display monochromatic images, it is preferred that the color displayed by the first display 301 is different from the color displayed by the second display 302.

Third Embodiment; See FIGS. 16 Through 18

Figure 16:
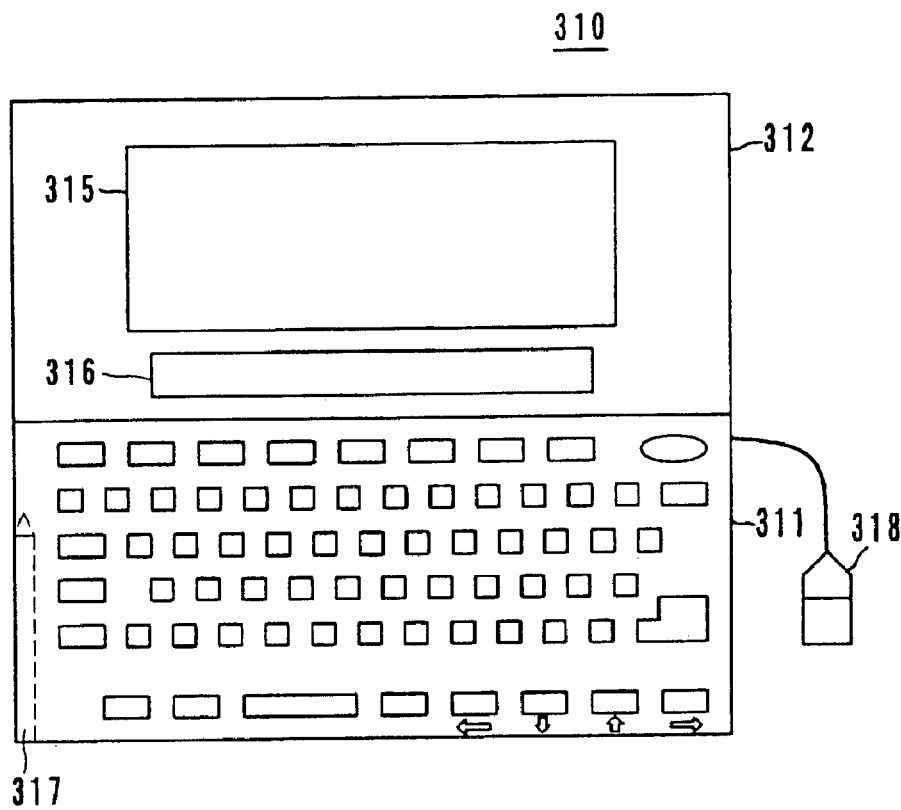
FIG. 16 is a front view of a PDA which is the third embodiment of the present invention.
Figure 17:
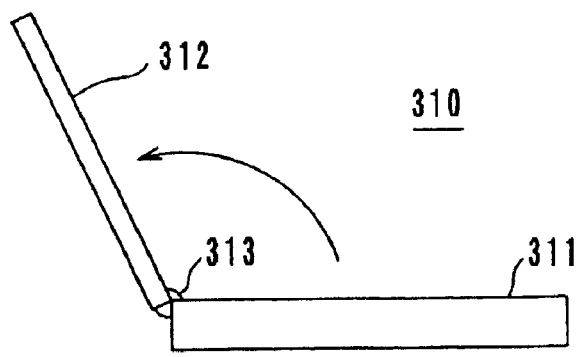
FIG. 17 is a side view of the PDA.

The third embodiment is a PDA 310. As FIGS. 16 and 17 shows, the PDA 310 has a lid 312 which is connected to a base casing 311 by a hinge 313 to be capable of opening and closing freely. A surface of the lid 312 is a display section. In the display section, a first display 315 and a second display 316 are separately provided. The first display 315 is a reflective type liquid crystal display with a memory effect as shown by FIG. 7, and the second display 316 a liquid crystal display which has nematic liquid crystal to be driven in a TN mode. A TFT (thin film transistor) is provided for every pixel so that the liquid crystal display can be driven by an active matrix driving method. The writing time of the second display 316 is shorter than that of the first display 315. The second display 316 may be any other type of display as long as the writing time is short.

In the base casing 311, various keys are provided, and a light pen 317 is encased in such a way to be freely taken out. Further, a portable telephone connecting terminal 318 is connected to the base casing 311.

Figure 18:
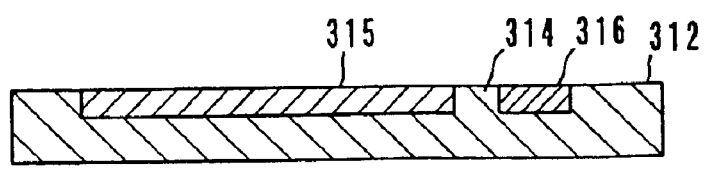
FIG. 18 is a schematic sectional view of a lid of the PDA.

In the third embodiment, inputs and revisions of information are displayed on the second display 316 which requires a shorter writing time. Then, entered information is transmitted and displayed on the first display 315 which has a memory effect. The PDA 310 has an advantage of keep displaying information on the first display 315 even after a power-off, and the second display 316 compensates for the disadvantage of the first display 315 that it takes a long time for writing. As FIG. 18 shows, since a partition area 314 is provided between the first display 315 and the second display 316, the lid 312 is reinforced, which prevents density unevenness of an image on the second display 315 which may be caused by an external stress.

Fourth Embodiment; See FIGS. 19 Through 23

The fourth embodiment is a PDA which is basically of the same structure as the third embodiment. In FIG. 19, the same members are denoted by the same reference symbols as in FIG. 16. What is different from the third embodiment is that the first display 315 and the second display 316 are arranged in contact with each other. Because the partition area 314 does not exist, the lid 312 is a little weaker. However, because the screens of the displays 315 and 316 are continuously arranged, the user can see the screens easily.

Here, an exemplary way of displaying information in the fourth embodiment is described. In the third embodiment, information is displayed in the same way.

Figure 21:
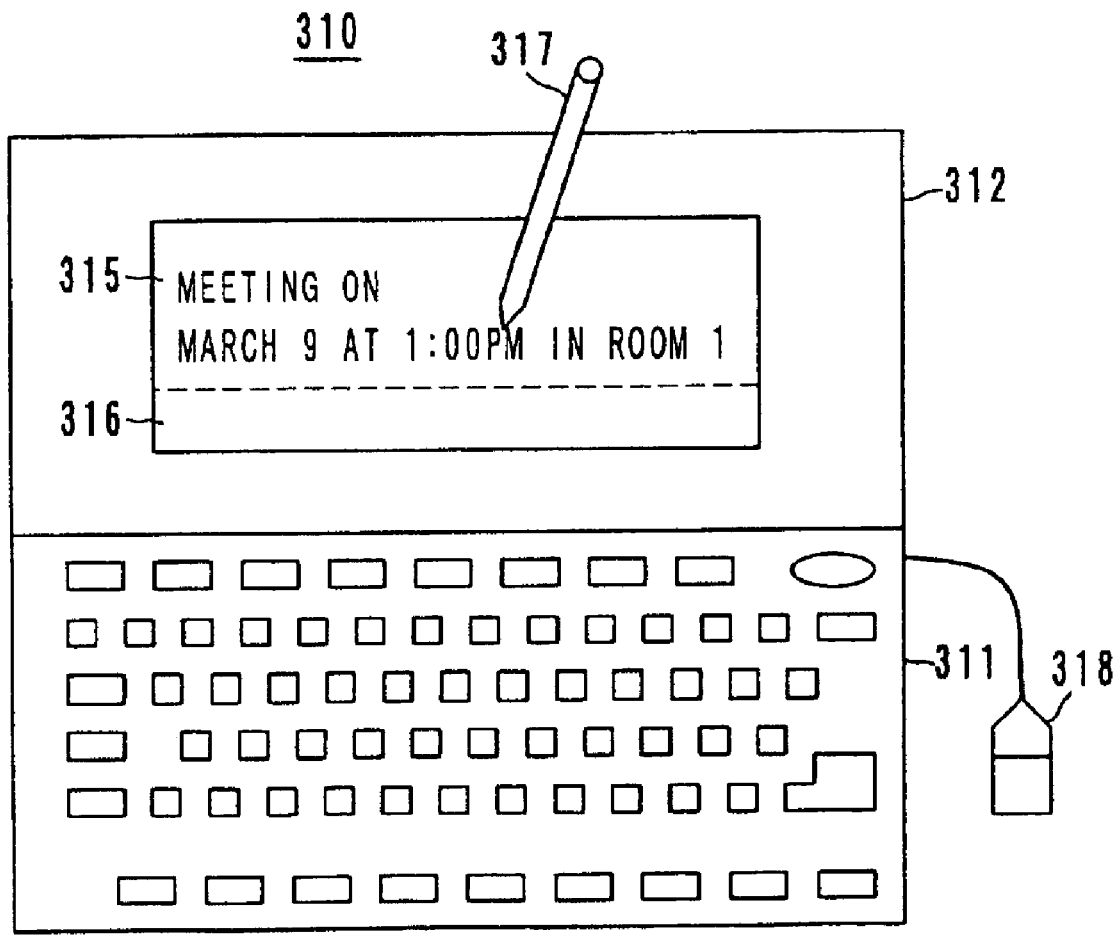
FIG. 21 is an illustration which shows a picture displayed on the PDA.

For example, as FIG. 21 shows, a sentence "Meeting on March 9 starts at 1:00 PM in Room 1." is displayed on the first display 315 as information to be sent. When the part of the information "1:00 PM in Room 1" is to be changed, first the part is designated by use of the light pen 317. Thereby, the part is displayed on the second display 316 (see FIG. 22a). Then, on the second display 316, letters to be changed are designated by use of the light pen 117 (see FIG. 22b). Next, by use of the ten-key on the keyboard or the light pen 317, "Room 1" is changed to "Room 2" (see FIG. 22c). On completion of the revision, the revised information is displayed on the first display 315 (see FIG. 22d).

In the third and fourth embodiments, if the density and/or the contrast of the second display 316 is/are set higher than those of the first display 315, the second display 316 will attract the user's attention. For the same purpose, the second display 316 may be a monochromatic display such as blue. Further, as FIG. 23 shows, the dot size of displayed letters on the second display 316 may be larger than that of the first display 315, which allows the user to follow the information written at a high speed more easily.

Fifth Embodiment; See FIGS. 24 Through 26

The Fifth embodiment is a mobile type terminal unit 320 to be employed in a global positioning system (GPS). The GPS is a system to clarify the geographic position of the terminal unit 320 by adopting a well-known satellite positioning method. Thereby, the terminal unit 320 is capable of indicating the current position in a map and instructing directions to a destination.

The terminal unit 320, as FIG. 24 shows, has a display section composed of a first display 321 and a second display 322. The first display 321 is a reflective type liquid crystal display with a memory effect as shown by FIG. 7. The second display 322 is a liquid crystal display which has nematic liquid crystal to be driven in a TN mode. A TFT (thin film transistor) is provided for every pixel so that the liquid crystal display can be driven by an active matrix driving method. The writing time of the second display 322 is shorter than that of the first display 321. The second display 322 may be of any other type as long as the writing time is short.

The terminal unit 320 further has a scroll key 323, a key group 324 for inputting an address or the like, a power switch 325, a mode key 326 and an antenna 327. The functions of these members are well known.

Here, an exemplary way of displaying information in the fifth embodiment is described. As FIG. 25a shows, on the first display 321, by use of the GPS, a map indicating the neighborhood of the terminal unit 320 is displayed, and the current position of the unit itself 320 is indicated by a mark "A" on the map. When the address of a destination is inputted by use of the key group 324, the inputted address is displayed on the second display 322 immediately (see FIG. 25b). At the same time, the destination is indicated by a mark "B" in the map displayed on the first display 321, and a route C to the destination is indicated.

Another way of displaying information is described. As FIG. 26a shows, by use of the GPS, a map indicating the neighborhood of the terminal unit 320 is displayed, and the current position of the unit 320 is indicated by a mark "A". At that time, if the display mode of the device 320 is set in a current position display mode, the address of the position indicated by the mark "A" is displayed as literal information on the second display 322 (see FIG. 26b).

Sixth Embodiment; See FIGS. 27 and 28

The sixth embodiment is a watch type terminal unit 330 to be employed in a GPS. As FIG. 27 shows, the terminal unit 330 has a display section composed of a first display 331 and a second display 332. The first display 331 is a reflective type liquid crystal display with a memory effect as shown by FIG. 7. The second display 332 is a liquid crystal display which has nematic liquid crystal to be driven in a TN mode. A TFT (thin film transistor) is provided for every pixel so that the liquid crystal display can be driven by an active matrix driving method. The writing time of the second display 332 is shorter than that of the first display 331. The second display 332 may be of any other type as long as the writing time is short.

The terminal device 330 further has an exclusive key group 333, a power switch 334, an antenna 335 and a wrist band 336. The functions of these members are well known.

Figure 28A:
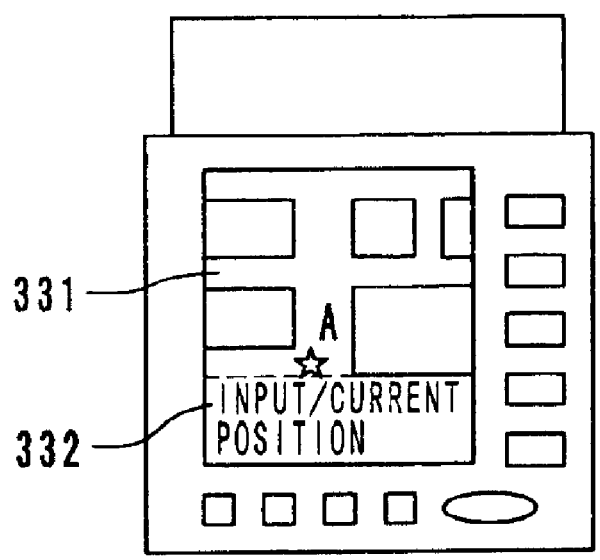
FIGS. 28a and 28b are illustrations which show a way of displaying information on the watch type terminal unit.

The display section of the sixth embodiment is basically the same as that of the fifth embodiment. Here, another way of displaying information on the display section is described. As FIG. 28a shows, when "current position" is inputted on the second display 332, a map and a mark A indicating the current position are displayed on the first display 331. The words "current position" are written on the second display 332 immediately but are erased soon for energy saving. It takes a relatively long time to write a map on the first display 331. Once the map is written, however, it is continuously displayed even after stoppage of supply of electric power, which reduces the consumption of electric power.

Figure 28B:
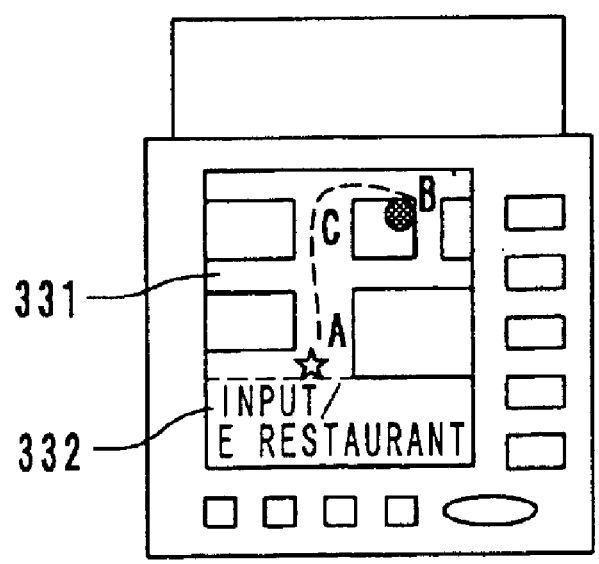

As FIG. 28b shows, in a destination input mode, when "E restaurant" is inputted on the second display 332, a mark B indicating the destination and a route C to the destination are displayed in a map on the first display 331. The letters displayed on the second display 332 are erased soon for energy saving. On completion of writing of the map on the first display 331, the supply of electric power is shut off. However, because of the memory effect of the display 331, the map is continuously displayed until erasure is commanded.

Seventh Embodiment; See FIGS. 29 and 30

The seventh embodiment is an information display apparatus 350A. As FIG. 29 shows, the apparatus 350A has a first display 351 with a relatively large screen and a second display 352 provided in the screen of the first display 351. The first display 351 is a display using choleteric liquid crystal or chiral nematic liquid crystal which has a memory effect. The second display 352 is a liquid crystal display which has nematic liquid crystal to be driven in a TN mode. A TFT (thin film transistor) is provided for every pixel so that the liquid crystal display can be driven by an active matrix driving method. The writing time of the second display 352 is shorter than that of the first display 351. The second display 352 may be of any other type as long as the writing time is short. In a casing 355, an electric power source, a control section are encased, and on a lower part of the casing 355, a power switch 361 and five selection switches 362 are provided.

FIG. 30 is a sectional view of the apparatus 350A. On the casing 355, the second display 352 and a spacer 356 are arranged, and the first display 351 is arranged thereon. The structure and the driving method of the first display 351 have been described with reference to FIG. 7. The structure and the driving method of the second display 352 are the same as those of a conventional TFT liquid crystal display.

As FIG. 29 shows, the first display 351 displays a relatively fixed still picture, and the second display 352 displays a motion picture which requires high-speed writing. When the second display 352 is to be used, the overlapping part of the first display 351 is set to a transparent state, so that a picture on the second display 352 appears through the transparent part of the first display 351. By turning off the second display 352, it is possible to display a picture written on the first display 351 on the whole screen.

A TFT liquid crystal display requires only a short time for writing and is suited to display a motion picture. It is, however, difficult to produce a TFT liquid crystal display with a large screen, and production of a large-sized TFT liquid crystal display is expensive. In the seventh embodiment, therefore, a large screen is made of cholesteric liquid crystal or chiral nematic liquid crystal which can be easily structured into a large-sized display. By using the respective advantages of the displays 351 and 352 and compensating the respective disadvantages of the displays 351 and 352 with each other, shortening of the writing time, enlarging of the screen, reduction of cost and energy saving can be achieved.

Eighth Embodiment; See FIGS. 31 and 32

The eighth embodiment is an information display apparatus 350B which has a first display 351, a second display 352 and a casing 355 which are the same as those of the seventh embodiment. FIG. 31 shows the screen of the information display apparatus 350B.

In the eighth embodiment, however, as FIG. 32 shows, the second display 352 is arranged on the same level with the first display 351. In the eighth embodiment, therefore, when the second display 352 is turned off, it is impossible to use the whole screen of the apparatus 350B. However, because the displays 351 and 352 are arranged separately without being laminated, the apparatus 350B of the eighth embodiment can be produced at lower cost than the apparatus 350A of the seventh embodiment. When the second display 352 is to be used, in the seventh embodiment, the overlapping part of the first display 351 must be set in a transparent state, whereas in the eighth embodiment, it is not necessary to set the first display 351 to a transparent state. Information can be displayed on the screen of the apparatus 350B in the same ways as on the screen of the apparatus 350A, and the eighth embodiment has substantially the same effects as the seventh embodiment. In the seventh embodiment, when the whole screen is used for a display made by the first display 351, a high quality picture can be displayed because there appears no joints between the displays 351 and 352. In the eighth embodiment, information can be clearly displayed on the second display 352 because the screen of the second display 352 can be seen directly.

Ninth Embodiment; See FIG. 33

The ninth embodiment is an information display apparatus 350C which has a first display 351, a second display 352 and a casing 355 which are the same as those of the seventh embodiment. The screen of the apparatus 350C is of the same structure as shown by FIG. 29.

Figure 33:
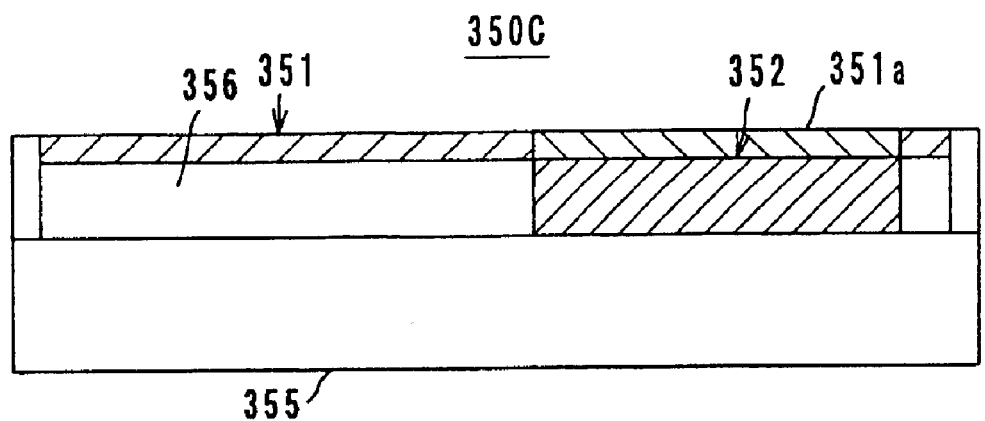
FIG. 33 is a schematic sectional view of an information display apparatus which is the ninth embodiment of the present invention.

As FIG. 33 shows, in the ninth embodiment, however, a transparent resin plate 351a is placed on the second display 352. The usage and the effects of the ninth embodiment are the same as those of the eighth embodiment.

Tenth Embodiment; See FIG. 34

The tenth embodiment is an information display apparatus 350D which has a first display 351, a second display 352 and a casing 355 which are the same as those of the seventh embodiment. The screen of the apparatus 350D is of the same structure as shown by FIG. 29.

Figure 34:
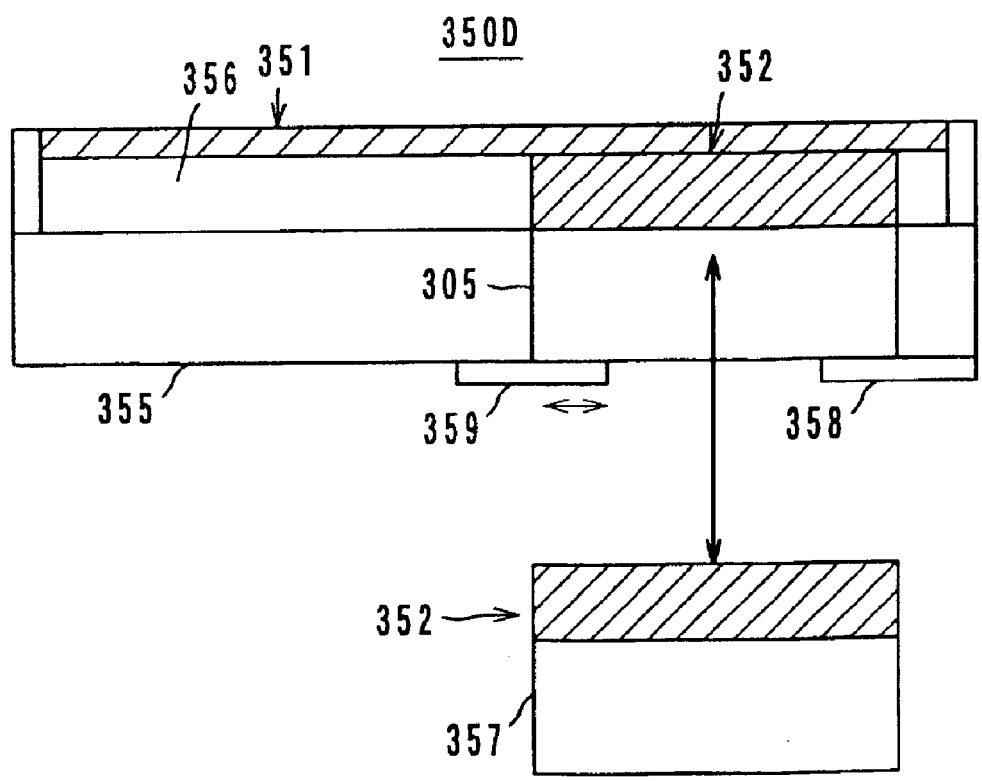
FIG. 34 is a schematic sectional view of an information display apparatus which is the tenth embodiment.

As FIG. 34 shows, in the tenth embodiment, however, the second display 352 is attachable to and detachable from the casing 355 through the reverse side of the casing 355 together with a board 357 with a control section therein. Accordingly, in the tenth embodiment, it is possible to detach the second display 352 from the casing 355 so as to display information on the second display 352 independently of the first display 351. The usage and the effects of the tenth embodiment are the same as those of the seventh embodiment.

The attaching/detaching mechanism of the second display 352 may be of any structure. For example, as FIG. 34 shows, a holder protrusion 358 and a slider 359 are provided on the reverse side of the casing 355, and the second display 352 is attached to or detached from the casing 355 as the slider 359 slides right and left.

Figure 35:
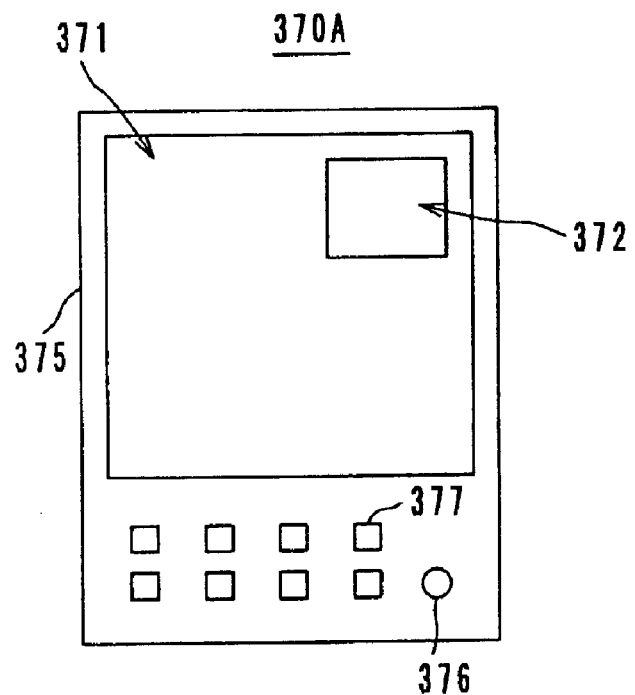
FIG. 35 is a front view of an electronic book which is the eleventh embodiment of the present invention.

Eleventh Embodiment; See FIG. 35

The eleventh embodiment is an electronic book 370A. On a casing 375, a first display 371 and a second display 372, a power switch 376 and a plurality of operation buttons 377 are provided. The first display 371, as in the seventh through tenth embodiment, is a reflective type liquid crystal display using cholesteric liquid crystal or chiral nematic liquid crystal which has a memory effect. The second display 372 is an organic EL (electro luminescence) display. The organic EL display is of a light emitting type and requires only a very short time for writing.

The first display 371 and the second display 372 are laminated as shown by FIG. 30, and the second display 372 is located under the first display 371. Information is displayed on the first and second displays 371 and 372 in the ways described in connection with the seventh embodiment.

In the eleventh embodiment, the first display 371 displays literal information of a book by using its memory effect. The second display 372 is used in a rapid mode to perform paging for skimming by using its short writing time, and a motion picture can be displayed on the second display 372.

In the eleventh embodiment, as the second display 372, any type of display which requires only a short time for writing can be used as well as an organic EL display. For example, the second display 372 may be a PDP (plasma display panel), an FED (field emission display), an LED (light emitting diode) or a FIL (fluorescent indicator lamp). The second display 372 also may be a TFT liquid crystal display.

Figure 36:
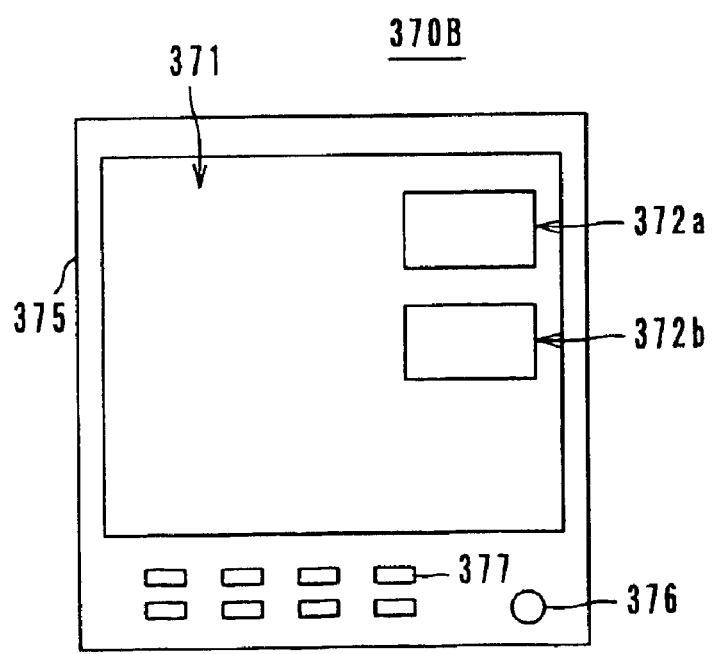
FIG. 36 is a front view of an electronic book which is the twelfth embodiment of the present invention.

Twelfth Embodiment; See FIG. 36

The twelfth embodiment is an electronic book 370B which is of the same structure as the eleventh embodiment. The electronic book 370B has a large-screen first display 371 and two small-screen second displays 372a and 372b.

The second displays 372a and 372b are of a type which requires only a short time for writing, and may be TFT liquid crystal displays, organic EL displays, PDPs, FEDs, LEDs, FILs or the like.

In the twelfth embodiment, information are displayed on the three displays 371, 372a and 372b in different ways. The respective writing times of the second displays 372a and 372b are shorter than that of the first display 371, and the writing time of the second display 372a is shorter than that of the second display 372b.

Figure 37:
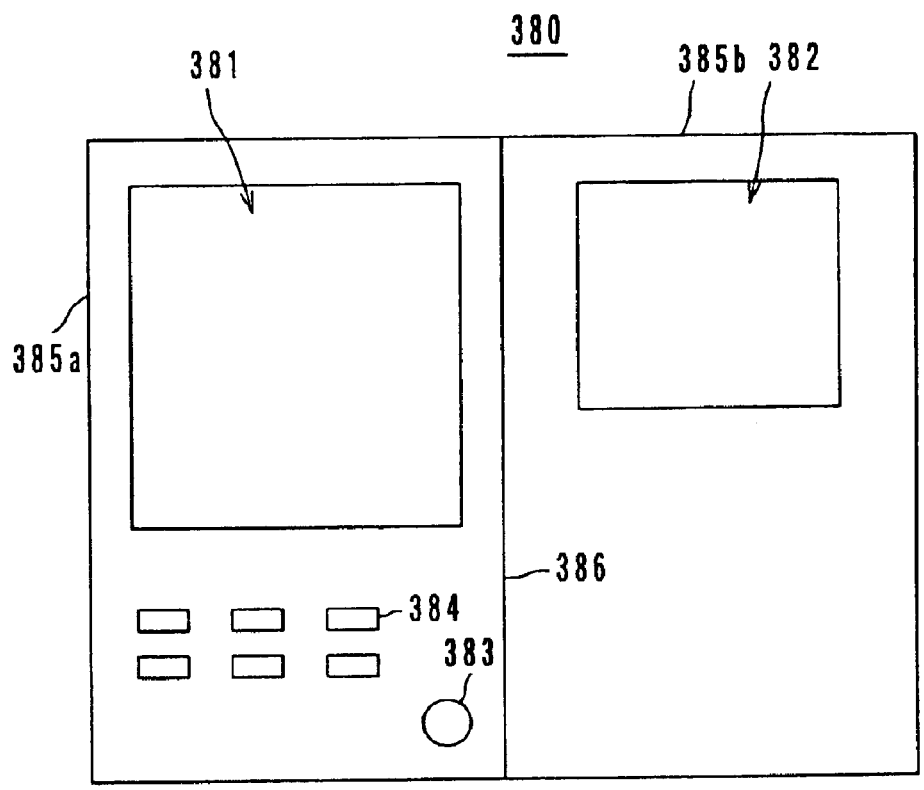
FIG. 37 is a front view of an electronic book which is the thirteenth embodiment of the present invention.

Thirteenth Embodiment; See FIG. 37

The thirteenth embodiment is an electronic book 380 which has a spreadable screen for two pages. Specifically, the electronic book 380 has two panels 385a and 385b and is foldable between the panels 385a and 385b. The left panel 385a comprises a reflective type liquid crystal display 381 using cholesteric liquid crystal or chiral nematic liquid crystal which has a memory effect, a power switch 383, a plurality of operation buttons 384 and a control section thereof. The right panel 385b comprises a second display 382 and a control section thereof. The second display 382 is a liquid crystal display which has nematic liquid crystal to be driven in a TN mode. A TFT (thin film transistor) is provided for every pixel so that the liquid crystal display can be driven by an active matrix driving method. The writing time of the second display 382 is shorter than that of the first display 381. The second display 382 may be of any other type as long as the writing time is short.

In the thirteenth embodiment, the first display 381 has a larger screen than the second display 382. The first display 381 and the second display 382 are used in the same ways as described in connection with the tenth embodiment. The first and second displays 381 and 382 display information using the respective advantages. The second display 382 may be a display of a light emitting type which requires a short time for writing, such as an EL display, a PDP, a FED, an LED, a FIL or the like.

Figure 38:
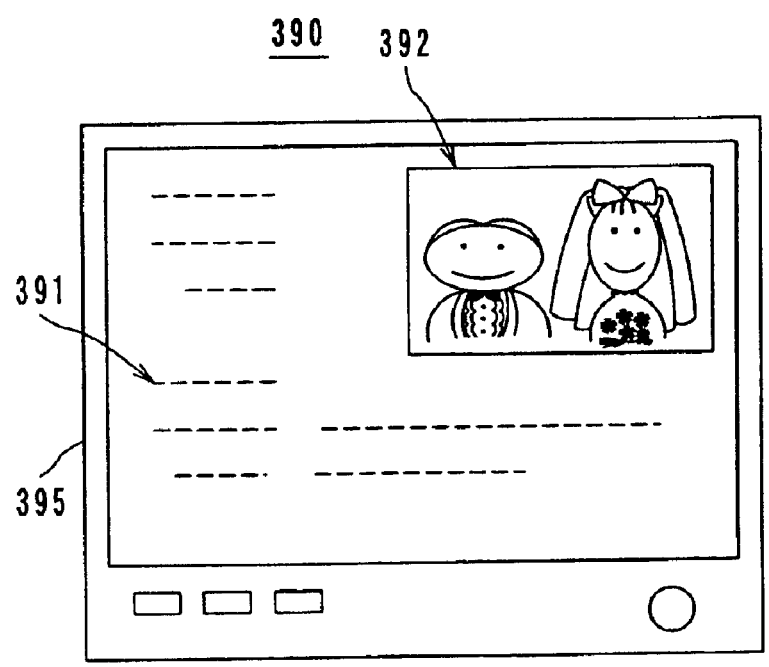
FIG. 38 is a front view of a bulletin board which is the fourteenth embodiment of the present invention.

Fourteenth Embodiment; See FIG. 38

The fourteenth embodiment is a bulletin board 390. On a casing 395, a large-screen first display 391 for displaying letters and a small-screen second display 392 for displaying an image. The first display 381, like the first display 371 in the eleventh embodiment, is a reflective type liquid crystal display using cholestric liquid crystal or chiral nematic liquid crystal which has a memory effect. The second display 392, like the second display 372 in the eleventh embodiment, is an organic EL display. The first display 371 and the second display 372 are arranged as shown by FIG. 32 or 33 so as not to overlap.

Generally, an image contains a larger volume of information than a group of letters, and the observer can recognize the content of the information easily from an image. Therefore, when literal information and image information are to be displayed on one screen, the following operation is preferable: while image information is fed forward rapidly on the second display 392, an image to be displayed is determined; and thereafter, literal information describing the image is displayed on the first display 391.

The second display 392 may be a TFT liquid crystal display.

Fifteenth Embodiment; See FIGS. 39 Through 44

In the fifteenth, sixteenth and seventeenth embodiments below, a display section is composed of a reflective type liquid crystal display with a memory effect as shown by FIG. 7, and part of the display section is driven by a second driving method wherein a driving voltage composed of reset pulses to reset the liquid crystal, selecting pulses to select desired display states of the respective pixels and maintaining pulses to fix the selected states of the pixels is applied to the liquid crystal. The other part is driven by the above-described first driving method. In the first driving method, an image with three or more tones can be displayed, but it takes a long time for writing. In the second driving method, although only a two-tone image is displayed, but it takes a relatively short time for writing.

FIG. 39 shows a driving section of the fifteenth embodiment. The liquid crystal display 100 is divided into a first display area 251 and a second display area 252 and is driven by a first scan driver 221a, a second scan driver 221b and a data driver 222. The first scan driver 221a drives the first display area 251 in the first driving method, and the second scan driver 221b drives the second display area 252 in the second driving method.

Figure 40:
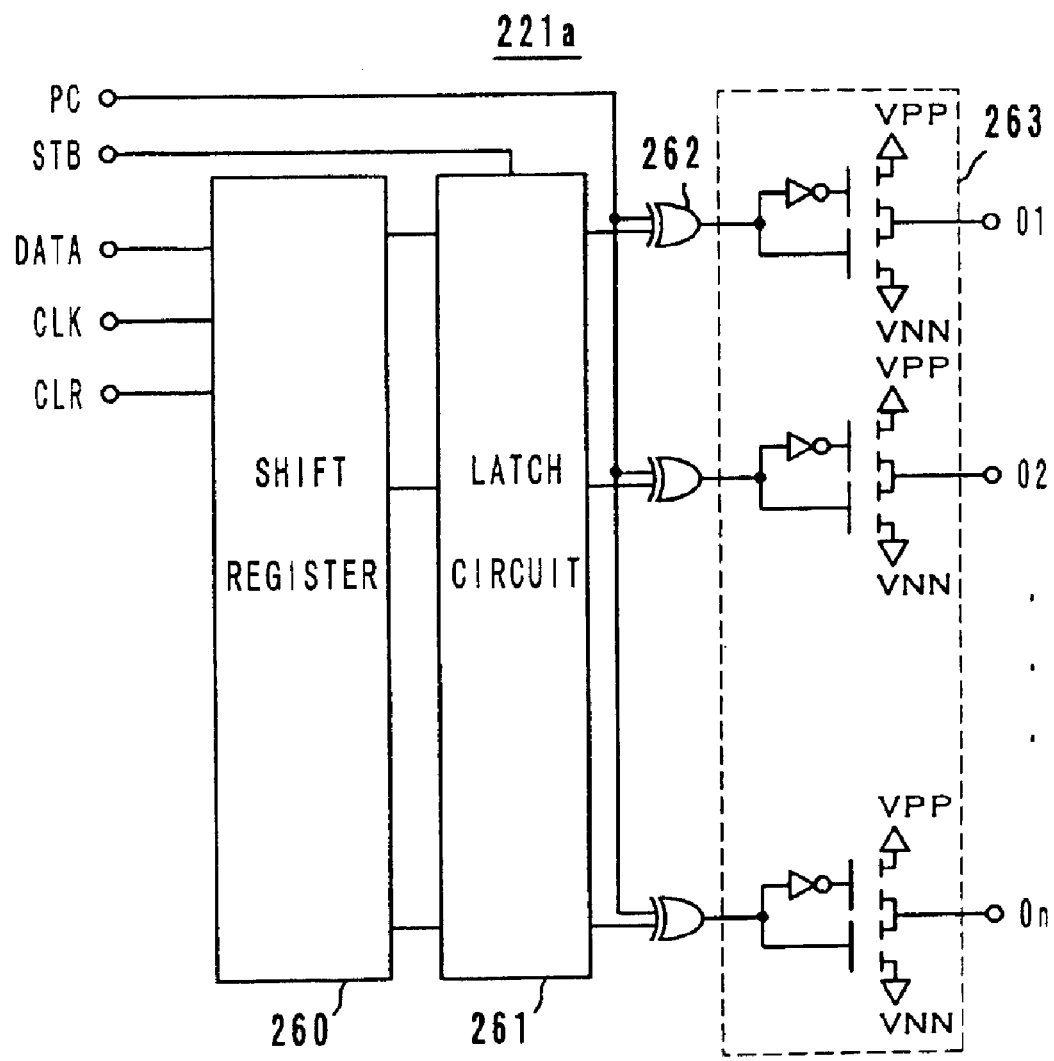
FIG. 40 is a block diagram of the internal circuit of a first scan driver.

FIG. 40 shows the internal circuit of the first scan driver 221a. The first scan driver 221a comprises a shift register 260, a latch circuit 261, a NAND circuit 262 and a driver 263 with a high withstand voltage. To the circuit, a polarity conversion signal PC, a latch strobe signal STB, a data signal DATA, a shift clock signal CLK and a register clear signal CLR are inputted.

Figure 41:
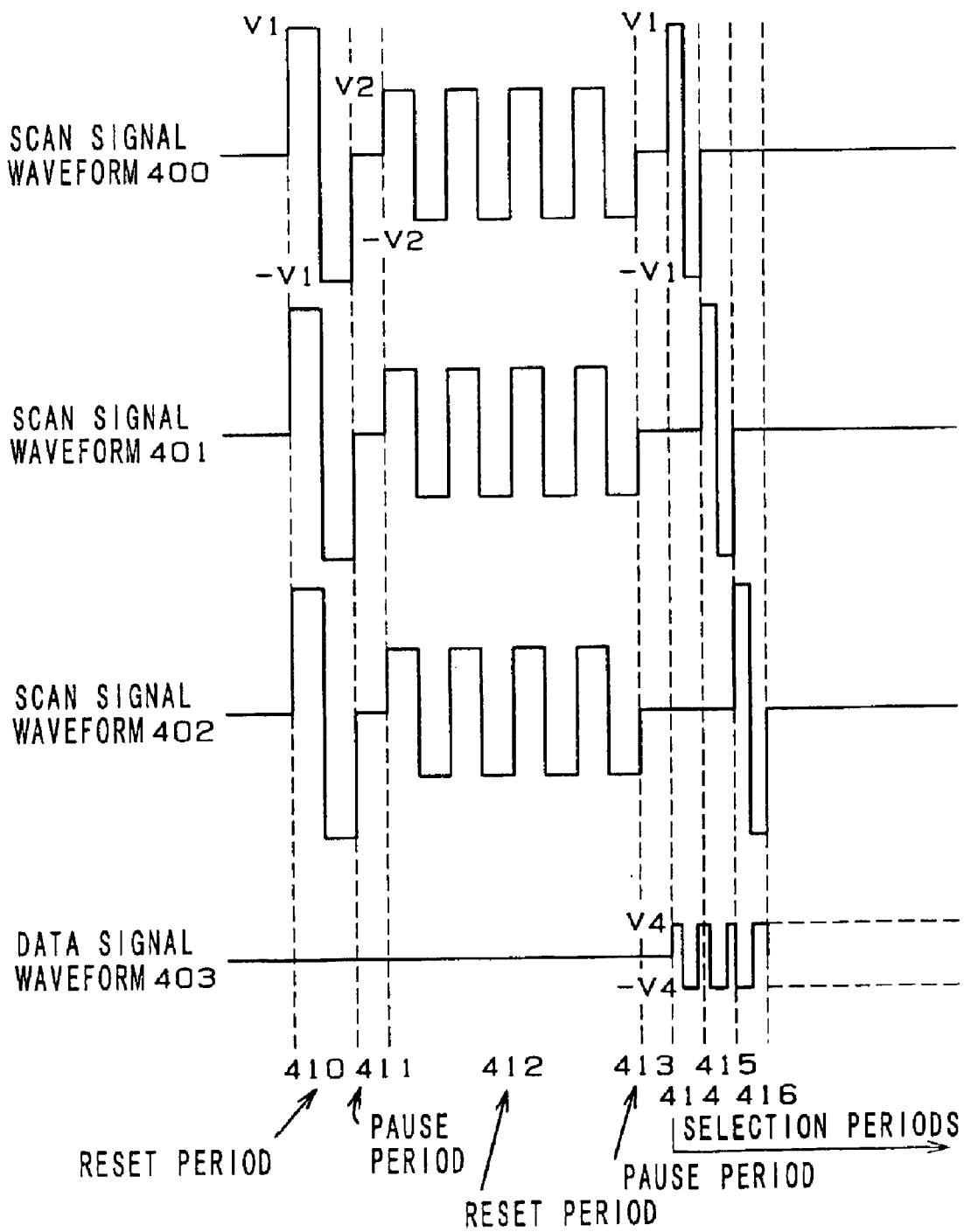
FIG. 41 is a chart which shows driving signal waveforms according to a first driving method.

FIG. 41 shows waveforms of scan signals and a data signal according to the first driving method. Signals of the waveforms 401, 402 and 403 are applied to a first scan electrode, a second scan electrode and a third scan electrode, respectively, and these signals are applied to all the scan electrodes in the first display area 251 in order. A signal of the waveform 403 is applied to the data electrodes in synchronization with the application of signals of the waveforms 400, 401 and 402. A driving duration is composed of a reset period 410, a pause period 411, a reset period 412, a pause period 413 and selection periods 414, 415 . . . .

In the first scan driver 221a, the data signal DATA is set in the shift register 260 in synchronization with the shift clock signal CLK, and when the latch strobe signal STB is inputted, the data are latched in the latch circuit 261. In accordance with the latched data and the polarity conversion signal PC, a signal VPP or a signal VNN is outputted from the driver 263. Table 1 is a truth table of the first scan driver 221a.

TABLE 1

| DATA1 | PC | Output |
|-------|----|--------|
| L | H | VNN |
| H | H | VPP |
| L | L | VPP |
| H | L | VNN |

In order to drive the first display area 251 in the first driving method, the outputs VPP and VNN from the driver 263 are switched among V1, V2, GND, −V1 and −V2 in the reset period 410, the pause period 411, the reset period 412, the pause period 413 and the selection periods 414, 415, 416 . . . . In the following, the times to switch the outputs are described.

In the reset period 410, the outputs VPP and VNN from the driver 263 are set to V1 and −V1, respectively. Thereby, in the reset period 410, a pulse signal of voltages V1 and −V1 is applied to the liquid crystal in the first display area 251.

In each of the pause periods 411 and 413, the outputs VPP and VNN from the driver 263 are set to V1 and GND, respectively. Thereby, in the pause periods 411 and 413, a signal of a GND level is applied to the liquid crystal in the first display area 251.

In the reset period 412, the outputs VPP and VNN from the driver 263 are set to V2 and −V2, respectively. Thereby, in the reset period 412, a pulse signal of voltages V2 and −V2 is applied to the liquid crystal of the first display area 251.

In each of the selection periods 413 through 416, the outputs VPP and VNN from the driver 263 are set to V1 and −V1, respectively. Thereby, in the selection periods 413 through 416, a pulse signal of voltages V1 and −V1 is applied to the liquid crystal in the first display area 251.

FIG. 42 shows the internal circuit of the second scan driver 221b. The internal circuit comprises a shift register 500, a latch circuit 501, a decoder 502 and a level shifter/seven-value driver 503 with a high withstand voltage. Into the circuit, a polarity conversion signal PC, a latch strobe signal STB, a two-bit data signal DATA, a shift clock signal CLK and a register clear signal CLR are inputted.

Figure 43:
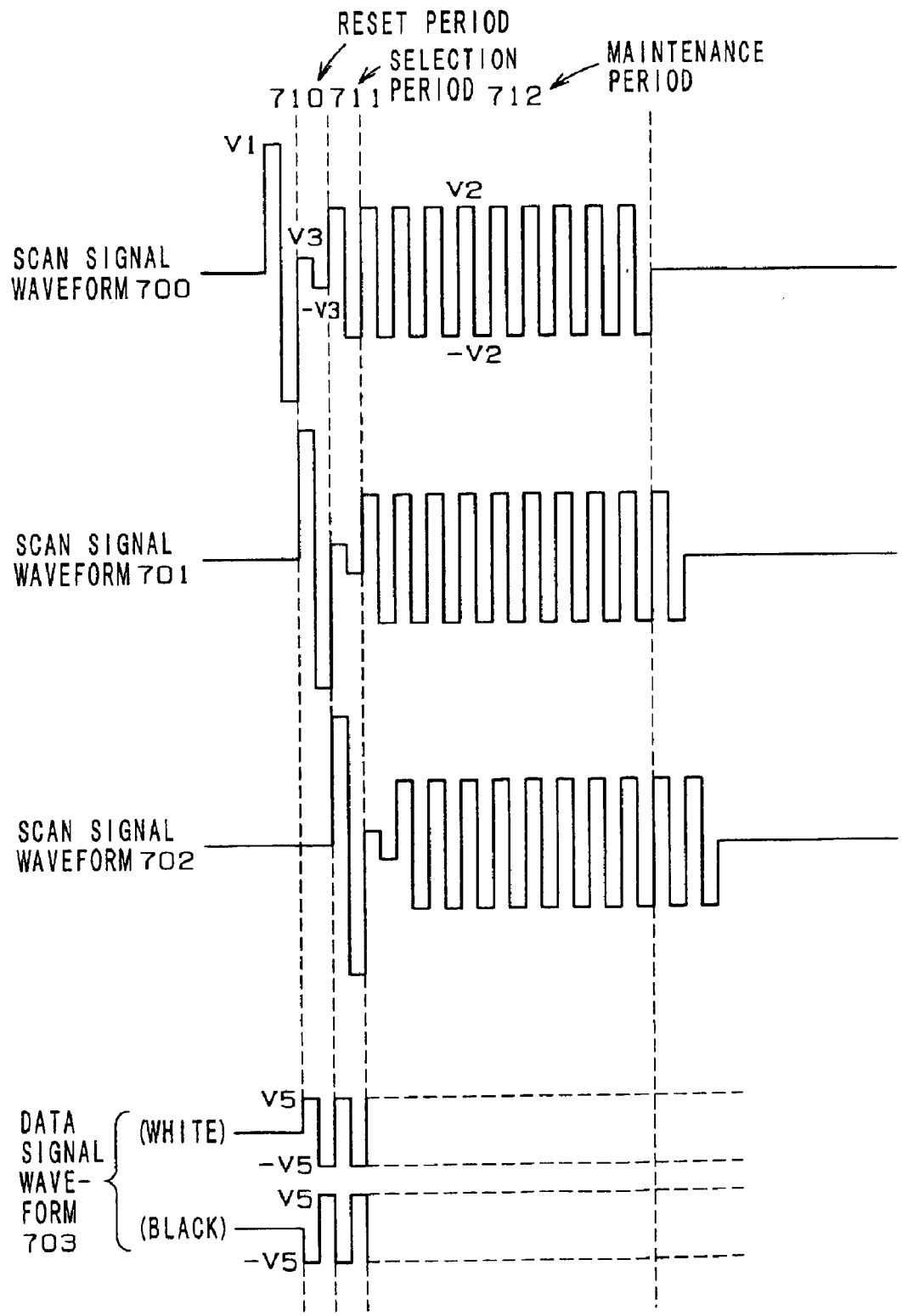
FIG. 43 is a chart which shows driving signal waveforms according to a second driving method.

FIG. 43 shows waveforms of scan signals and a data signal according to the second driving method. Signals of the waveforms 700, 701 and 702 are applied to a first scan electrode, a second scan electrode and a third scan electrode, respectively, and these signals are applied to all the scan electrodes in the second display area 252 in order. A signal of the waveform 703 is applied to the data electrodes in synchronization with the application of signals of the waveforms 700, 701 and 702. A driving duration is composed of a reset period 710, a selection period 711 and a maintenance period 712. The signals of the waveforms 700, 701 and 702 start to be applied at lags of a one-line scan time. As is apparent from these waveforms, in the second driving method, it is necessary to output different voltages V1, V2 and V3 or −V1, −V2 and −V3 simultaneously. In order to comply with this, the second scan driver 221b has a driver 503 which outputs seven different voltages V1, V2, V3, −V1, −V2, −V3 and GND.

In the second scan driver 221b, the two-bit data signal DATA is set in the shift register 500 in synchronization with the shift clock signal CLK, and when the latch strobe signal STB is inputted, the data are latched in the latch circuit 501. The latched two-bit data are decoded by the decoder circuit 502 in accordance with the polarity conversion signal PC. Then, from the level shifter/driver 503, any specified voltage V1, V2, V3, −V1, −V2, −V3 or GND is outputted. Table 2 is a truth table of the second scan driver 221b.

TABLE 2

| DATA1 | DATA2 | PC | Output |
|-------|-------|----|--------|
| L | L | H | GND |
| L | H | H | V1 |
| H | L | H | V2 |
| H | H | H | GND |
| L | L | L | GND |
| L | H | L | −V1 |
| H | L | L | −V2 |
| H | H | L | GND |

FIG. 44 shows the internal circuit of the data driver 222. The internal circuit comprises a shift register 800, a latch circuit 801, a comparator 802, a decoder circuit 803, a level shifter/three-value driver 804 with a high withstand voltage and a counter 805. Into the circuit, an output inhibiting signal OE, a polarity conversion signal PC, a latch strobe signal STB, an eight-bit data signal DATA, a shift clock signal CLK, a register clear signal CLR, a counter clock signal CLK and a counter clear signal CCLR are inputted.

In the data driver 222, the eight-bit data signal DATA is set in the shift register 800 in synchronization with the shift clock signal CLK, and when the latch strobe signal STB is inputted, the data are latched in the latch circuit 801. Then, when the count clock signal CCLK is inputted to the counter 805, a count-up process is performed. More specifically, the comparator 802 compares the output from the latch circuit 801 with the output from the counter 805. When the output from the latch circuit 801 is larger, the comparator outputs a HI level signal, and when the output from the latch circuit is smaller, the comparator outputs a LOW level signal. The decoder 803 receives the output from the comparator 802, the output inhibiting signal OE and the polarity conversion signal PC and outputs a voltage of VPP, VNN or GND to drive the level shifter/driver 804. Table 3 is a truth table of the data driver 222.

TABLE 3

| Output from Comparator | PC | OE | Output |
|---|---|---|---|
| Indefinite | Indefinite | H | GND |
| L | L | L | −V4 |
| H | L | L | V4 |
| L | H | L | V4 |
| H | H | L | −V4 |

In the fifteenth embodiment, the first display area 251 of the liquid crystal display 100 is connected to the first scan driver 221a which drives the first display area 251 in the first driving method, and the second display area 252 is connected to the second scan driver 221b which drives the second display area 252 in the second driving method. Accordingly, in the first display area 251, an image is written by the first driving method, and in the second display area 252, an image is written by the second driving method.

In the first driving method and in the second driving method, liquid crystal moves differently, and it may be necessary to set the data pulse signal applied to the first display area 251 from the data driver 222 and the data pulse signal applied to the second display area 252 from the data driver 222 to be of mutually different voltages. In this case, in driving the first display area 251, the outputs VPP and VNN from the data driver 222 are set to V4 and −V4, respectively, and in driving the second display area 252, the outputs VPP and VNN from the data driver 222 are set to V5 and −V5, respectively.

In the first driving method, although full-color display is possible, the time required for writing on one line is approximately 3 ms. On the other hand, in the second driving method, the time required for writing on one line is approximately 0.3 msc. In short, in the second driving method, writing is performed approximately 10 times as fast as in the first driving method. In order to make a full-color display in the second driving method, however, the thickness of the liquid crystal layer must be even with very high accuracy, and to produce such a liquid crystal display is very difficult. In order to make a full-color display by turning on and off each of the liquid crystal layers, the requirement to the thickness of the liquid crystal layers is not so accurate, and this is easily realized. In consideration for the above points, in the fifteenth embodiment, an image to be displayed at full color is written in the first display area 251 and an image to be displayed at a high speed is written in the second display area 252.

Sixteenth Embodiment; See FIGS. 45 and 46

The above-described second scan driver 221b is capable of outputting seven different voltages V1, V2, V3, −V1, −V2, −V3 and GND, and by using five of them, namely, V1, V2, −V1, −V2 and GND, the second scan driver is capable of executing the first driving method.

In the sixteenth embodiment, as FIG. 45 shows, all the scan electrodes of the liquid crystal display 100 are driven by the second driver 221b. The liquid crystal display 100 is divided into an upper first display area 251a, a lower first display area 251b and a second display area 252 which is located between the upper and lower first display areas 251a and 251b. The second display area 252 is driven by the second driving method, and the first display areas 251a and 251b are driven by the first driving method. The reverse is also possible. In the sixteenth embodiment, any desired scan electrodes can be driven in either of the first driving method and the second driving method, and thus, a first display area and a second display area can be set arbitrarily.

In changing the image on the display 100, first, the whole screen is subjected to writing by the first driving method, and a part to be changed (here, the second display area 252) is subjected to writing by the second driving method. Also, it is possible to perform writing by the second driving method on the whole screen first and to perform writing by the first driving method on a part to be changed (the second display area 252). In the first driving method, it takes a long time for writing, but a full-color display is possible. In the second driving method, a full-color display is difficult, but it takes only a short time for writing.

Writing on the part to be changed can be performed not only once but several times repeatedly after writing on the whole screen. As FIGS. 46a and 46b show, a menu window 253 opens on the screen, and it is possible to change the content displayed in the window 253 serially. At this time, if the information to be serially displayed in the window 253 does not have to be displayed at full color, for example, if the information is of a text type, this part shall be driven by the second driving method, which results in making a high-speed display.

Seventeenth Embodiment; See FIG. 47

Figure 47:
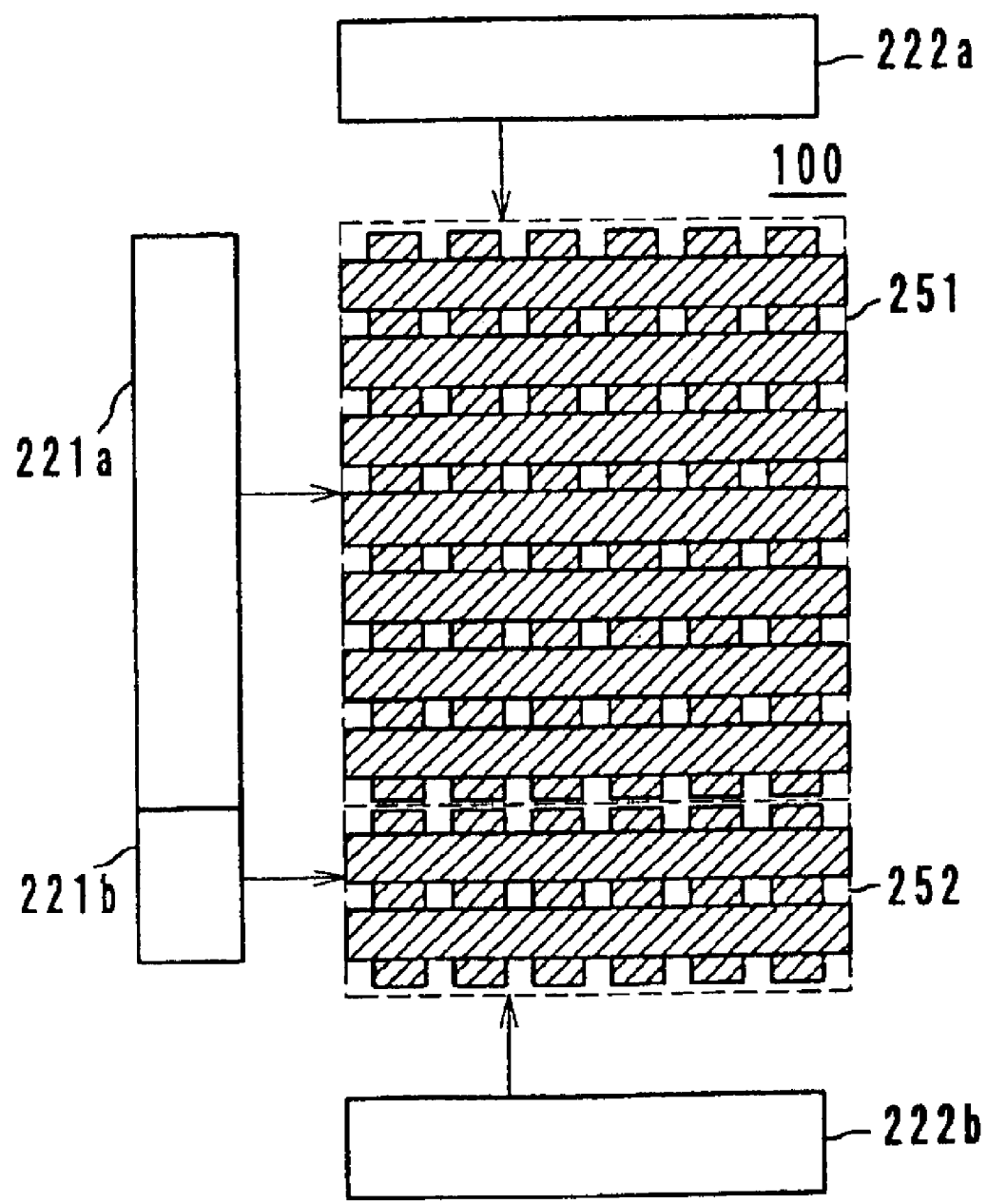
FIG. 47 is a block diagram of a driving section of an information display apparatus which is the seventeenth embodiment of the present invention.

In the seventeenth embodiment, as in the fifteenth and sixteenth embodiments, part of the liquid crystal display is driven by the first driving method, and the other part is driven by the second driving method. As FIG. 47 shows, the seventeenth embodiment comprises a first scan driver 221a, a second scan driver 221b and data drivers 222a and 222b.

What are different from the fifteenth embodiment are that the data electrodes are divided into a first display area 251 and a second display area 252 and that the display areas 251 and 252 are connected to the respective data drivers 222a and 222b. In this structure, the first display area 251 and the second display area 252 are driven by circuits which are completely independent of each other. Accordingly, data signal waveforms of different voltages can be applied to the liquid crystal display 100, and the first and second display areas 251 and 252 can be scanned simultaneously. Also, a crosstalk, which is a problem that a data signal is applied to unselected scan electrodes, can be avoided. Because the data electrodes are divided, the display areas 251 and 252 does not interfere with each other.

Although the present invention has been described in connection with the preferred embodiments above, it is to be noted that various changes and modifications are possible to those who are skilled in the art. Such changes and modifications are understood as being within the present invention.

What is claimed is:

1. An information display apparatus comprising:
   a liquid crystal display comprising a liquid crystal material, a plurality of scan electrodes and a plurality of data electrodes, said liquid crystal material exhibiting, at room temperature, a cholesteric phase in which said liquid crystal material has a bistability between a focal-conic state and a planar state in which said liquid crystal material exhibits a selective reflection characteristic, said scan electrodes and said data electrodes defining a plurality of liquid crystal pixels;
   a driver comprising a scan electrode driver and a data electrode driver, said scan electrode driver including a shift register and a plurality of output terminals respectively connected to said scan electrodes, said data electrode driver including a shift register and a plurality of output terminals respectively connected to said data electrodes to drive said liquid crystal display; and
   a controller which is connected to said driver, said controller being capable of controlling said driver to repeatedly select only part of the scan electrodes by controlling the shift register of the scan electrode driver to perform writing on only part of the pixels of the liquid crystal display corresponding to the selected scan electrodes,
   wherein said driver performs repetitious writing on said part of the pixels of the liquid crystal display corresponding to the selected scan electrodes by applying voltage pulses including a reset pulse to reset the liquid crystal to a homeotropic state and a selection pulse to select a desire display state of the liquid crystal, the voltage pulses including the reset pulse and the selection pulse being applied to each of the selected scan electrodes sequentially for repetitious writing.

2. An information display apparatus according to claim 1, wherein said controller controls said driver based on motion picture data.

3. An information display apparatus according to claim 1, wherein said controller sends data regarding a writing start line and a writing end line to said driver.

4. An information display apparatus according to claim 1, wherein said driver is capable of selecting a plurality of parts of scan electrodes repeatedly to perform repetitious writing on a plurality of parts of the liquid crystal display corresponding to the selected scan electrodes.

5. An information display apparatus according to claim 1, wherein the part of the liquid crystal display selected for repetitious writing thereon is smaller than a non-selected part of the liquid crystal display.

6. An information display apparatus according to claim 1, wherein while repetitious writing on the selected part of the liquid crystal display is performed, a non-selected part of the liquid crystal display keeps displaying information thereon by using a memory effect of the liquid crystal material.

7. An information display apparatus according to claim 1, wherein writing on an entirety of the liquid crystal display is performed at specified intervals.

8. An information display apparatus according to claim 1, wherein the part of the liquid crystal display selected for repetitious writing thereon includes a number of scan electrodes, the number being less than a limit within which a display made thereon can be seen as a motion picture.

9. An information display apparatus according to claim 1, wherein the liquid crystal material is a mixture of nematic liquid crystal with a chiral agent of an amount sufficient to permit the liquid crystal material to exhibit a cholesteric phase.

10. An information display apparatus according to claim 1, wherein the liquid crystal display makes a full color display.

11. An information display apparatus according to claim 1, wherein the liquid crystal display makes a monochromatic display.

12. An information display apparatus according to claim 1, wherein:
the liquid crystal display comprises a plurality of liquid crystal layers stacked one upon another; and
the liquid crystal display displays a motion picture thereon by driving two or more of the liquid crystal layers concurrently.

13. An information display apparatus according to claim 1, wherein the part of the liquid crystal display to be selected for repetitious writing thereon is variable with respect to position and size.

14. An information display apparatus comprising:
a liquid crystal display comprising a liquid crystal material, a plurality of scan electrodes and a plurality of data electrodes, said liquid crystal material exhibiting, at room temperature, a cholesteric phase in which said liquid crystal material has a bistability between a focal-conic state and a planar state in which said liquid crystal material exhibits a selective reflection characteristic, said scan electrodes and said data electrodes defining a plurality of liquid crystal pixels;
a driver comprising a scan electrode driver and a data electrode driver, said scan electrodes driver including a shift register and a plurality of output terminals respectively connected to said scan electrodes, said data electrode driver including a shift register and a plurality of output terminals respectively connected to said data electrodes to drive said liquid crystal display; and
a controller which is connected to said driver, said controller being capable of controlling said driver to repeatedly select only part of the scan electrodes by controlling the shift register of the scan electrode driver to perform writing on only part of the pixels of the liquid crystal display corresponding to the selected scan electrodes;
wherein:
writing is performed repeatedly on the part of the pixels of the liquid crystal display corresponding to the selected scan electrodes; and
the part of the pixels of the liquid crystal display which does not correspond to the selected scan electrodes and which maintains a display by use of a memory effect of the liquid crystal includes pixels making displays of intermediate tones.

15. An information display apparatus comprising:
a liquid crystal display comprising a liquid crystal material, a plurality of scan electrodes and a plurality of data electrodes, said liquid crystal material exhibiting, at room temperature, a cholesteric phase in which said liquid crystal material has a bistability between a focal-conic state and a planar state in which said liquid crystal material exhibits a selective reflection characteristic, said scan electrodes and said data electrodes defining a plurality of liquid crystal pixels;
a driver comprising a scan electrode driver and a data electrode driver, said scan electrodes driver including a shift register and a plurality of output terminals respectively connected to said scan electrodes, said data electrode driver including a shift register and a plurality of output terminals respectively connected to said data electrodes to drive said liquid crystal display; and
a controller which is connected to said driver, said controller being capable of controlling said driver to repeatedly select only part of the scan electrodes by controlling the shift register of the scan electrode driver to perform writing on only part of the pixels of the liquid crystal display corresponding to the selected scan electrodes;
wherein:
said driver performs repetitious writing on said part of the pixels of the liquid crystal display corresponding to the selected scan electrodes by applying voltage pulses including a reset pulse to reset the liquid crystal to a homeotropic state and a selection pulse to select a desired display state of the liquid crystal, the voltage pulses including the reset pulse and the selection pulse being applied to each of the selected scan electrodes sequentially for repetitious writing; and
the part of the pixels of the liquid crystal display which does not correspond to the selected scan electrodes and which maintains a display by use of a memory effect of the liquid crystal includes pixels making displays of intermediate tones.

* * * * *